US012720608B2

(12) United States Patent
Alfarhan et al.

(10) Patent No.: US 12,720,608 B2
(45) Date of Patent: Aug. 25, 2026

(54) COVERAGE EXTENSION BY PREAMBLE REPETITION

(71) Applicant: InterDigital Patent Holdings, Inc., Wilmington, DE (US)

(72) Inventors: Faris Alfarhan, Montreal (CA); Paul Marinier, Brossard (CA); Fumihiro Hasegawa, Westmount (CA); Aata El Hamss, Laval (CA); Moon Il Lee, Melville, NY (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 280 days.

(21) Appl. No.: 18/690,846

(22) PCT Filed: Sep. 26, 2022

(86) PCT No.: PCT/US2022/044707
§ 371 (c)(1),
(2) Date: Mar. 11, 2024

(87) PCT Pub. No.: WO2023/055685
PCT Pub. Date: Apr. 6, 2023

(65) Prior Publication Data

US 2025/0142624 A1 May 1, 2025

Related U.S. Application Data

(60) Provisional application No. 63/308,471, filed on Feb. 9, 2022, provisional application No. 63/250,017, filed on Sep. 29, 2021.

(51) Int. Cl.
*H04W 74/0833* (2024.01)
*H04B 7/06* (2006.01)
*H04W 72/044* (2023.01)

(52) U.S. Cl.
CPC ...... *H04W 74/0833* (2013.01); *H04B 7/0626* (2013.01); *H04W 72/046* (2013.01)

(58) Field of Classification Search
None
See application file for complete search history.

(56) References Cited

U.S. PATENT DOCUMENTS 12,267,870 B2 * 4/2025 Singh .................... H04L 5/0048
2018/0332520 A1 11/2018 Cheng et al.
(Continued)

FOREIGN PATENT DOCUMENTS

TW 202131654 A 8/2021
WO 2016086144 A1 11/2015
(Continued)

OTHER PUBLICATIONS

Third Generation Partnership Project (3GPP), "Physical layer procedures for control", Technical Specification Group Radio Access Network; NR, Release 16, 3GPP TS 38.213 V16.5.0, Valbonne, France, Mar. 2021, 183 pages.
(Continued)

*Primary Examiner* — Anh Ngoc M Nguyen
(74) *Attorney, Agent, or Firm* — Flaster Greenberg, P.C.

(57) ABSTRACT

Devices, methods, and systems for coverage extension. A bundle of repeated transmissions of a preamble are transmitted responsive to a reference signal received power (RSRP) being less than a threshold and a random access (RA) procedure being initiated. A random access response (RAR) window is monitored for a random access radio network temporary identity (RA-RNTI) corresponding to the repeated transmissions of the preamble. In some implementations, each of the repeated transmissions of the preamble is transmitted based on a spatial filter that is different from others of the repeated transmissions of the preamble. In
(Continued)

some implementations, each of the repeated transmissions of the preamble comprises a preamble index that is different from preamble indices of others of the repeated transmissions of the preamble. In some implementations, the spatial filter comprises a transmission (Tx) beam. In some implementations, the bundle of repeated transmissions of the preamble comprises retransmissions of a msg1.

20 Claims, 10 Drawing Sheets

(56) References Cited

U.S. PATENT DOCUMENTS

2020/0120709 A1 4/2020 Bergquist et al.
2021/0385849 A1 12/2021 Matsumura et al.
2022/0006575 A1 1/2022 Cozzo et al.
2022/0386244 A1 12/2022 Lei et al.
2024/0023095 A1* 1/2024 He .................... H04L 1/1893

FOREIGN PATENT DOCUMENTS

WO 2018164515 A1 9/2018
WO 2020032618 A1 2/2020
WO 2020090061 A1 5/2020
WO 2020167794 A1 8/2020
WO 2021102794 A1 6/2021

OTHER PUBLICATIONS

Third Generation Partnership Project (3GPP), "Medium Access Control (MAC) protocol specification", Technical Specification Group Radio Access Network; NR, Release 16, 3GPP TS 38.321 V16.3.0, Valbonne, France, Dec. 2020, 156 pages.

* cited by examiner

COVERAGE EXTENSION BY PREAMBLE REPETITION

CROSS-REFERENCE TO RELATED APPLICATION

This application is the 371 National Stage of International Application No. PCT/US2022/044707, filed Sep. 26, 2022, which claims priority to U.S. Provisional Patent Application No. 63/308,471, filed on Feb. 9, 2022, and to U.S. Provisional Patent Application No. 63/250,017, filed on Sep. 29, 2021, the entire contents of each of which are incorporated herein by reference.

BACKGROUND

In legacy new radio (NR) networks, a wireless transmit receive unit (WTRU) cannot retransmit a random access preamble (msg1) of a random access channel procedure (RACH) unless a monitoring window for a random access response (msg2) has expired without the WTRU receiving a response from a gNB. Under some conditions, a preamble correlator of the gNB may not be able to correctly decode the preamble.

SUMMARY

Devices, methods, and systems for coverage extension are described herein. For example, transmission repetition and/or adaption may be performed by a WTRU during a random access procedure. One or more transmissions sent by the WTRU during the random access procedure may be repeated and/or adapted by the WTRU. For example, a WTRU may transmit a RACH Message 1 (e.g., Msg1 or a physical random access channel (PRACH) preamble) and one or more repetitions of RACH Message 1. The repetitions may result in an increase of the probability of Msg1 detection at the network (e.g., gNB). Repetition of RACH Msg. 1 may reduce the overall latency associated with random access for WTRUs, for example during poor coverage conditions.

The WTRU may be configured with one or more local beam sets for the random access procedure. For example, the WTRU may be configured to select on or more downlink beams. Each downlink beam may be associated with a respective local beam set. For example, the local beam set may be comprised of relatively narrower beams that are associated with the relatively wider beam selected by the WTRU. The WTRU may determine corresponding UL beams that are associated by one or more beams of the local beam set. The UL beams may be associated with RACH resources. The WTRU may transmit the RACH msg 1 by repeating transmission of msg1 on the associated RACH resources of the UL beams.

As an example, a WTRU may be configured to receive configuration information indicating one or more reference signals (RSs) associated with a first synchronization signal block (SSB) and a respective set of one or more random access channel (RACH) occasions (ROs) for each of the one or more RSs. The first SSB may be associated with a downlink beam. The one or more RSs may be associated with a local beam set. The local beam set may be associated with the downlink beam corresponding to the first SSB. The network (e.g., gNB) may broadcast multiple SSBs and one or more (e.g., each) of the SSBs of the multiple SSBs may be associated with a corresponding local beam set. The RSs associated with the first SSB may be indicative of multiple beams in the local beam set. For example, each beam in the local beam set may be associated with a respective reference signal(s) of the RSs. Thus, by measuring the RSs, the WTRU may determine which beams of the local beam set has the strongest signal quality.

For instance, the WTRU may determine a subset of RSs associated with the first SSB. The subset of RSs may correspond to the strongest beams in the local beam set associated with the first SSB. Each of the subset of RSs (e.g., selected beams in the local beam set) may be associated with corresponding RACH preamble(s) and/or RACH occasions (ROs). The WTRU may be configured to transmit a first preamble (e.g., RACH msg 1) via a first RO associated with a first RS in the determined subset and a second preamble (e.g., RACH msg 1) on a second RO associated with a second RS in the determined subset. The first and second preambles may be the same preamble or different preambles.

The WTRU may receive multiple random access responses (RARs). For example, the WTRU may receive a first RAR comprising a first grant and second RAR comprising a second grant. The first RAR may be associated with the first RO and the second RAR may be associated with the second RO. In response, the WTRU may transmit a message in accordance with the first grant and a repetition of the message in accordance with the second grant. The message may correspond to a RACH message 3. The transmission in accordance with the first grant may be associated with a first spatial filter associated with the first RO and the transmission in accordance with the second grant is associated with a second spatial filter associated with the second RO. The spatial filters may be associated with respective local beams in the local beam set. By using different spatial filters for the RACH message 3 transmission, the probability of successful reception of the message at the network (e.g., gNB) may be increased. In an example, a WTRU may transmit a second repetition of the message using a third grant, wherein the transmission using the third grant uses a third spatial filter associated with a third RO.

In order to allow a WTRU to evaluate/measure multiple local beams sets associated with different SSBs, the configuration information received by the WTRU may indicate respective RSs and associated sets of one or more ROs for each of a plurality of SSBs. Thus, each SSB may be associated with a respective plurality of RSs, and different RSs within the plurality may correspond to different beams within the local beam set for that SSB. The RS may also be SSBs or another type of reference signal (e.g., a CSI-RS). The WTRU may first select a first SSB from the plurality of SSBs, and may then select a subset of beams in the local beam set corresponding to the first SSB based on measurements of the reference signals associated with the SSB.

In an example, a bundle of repeated transmissions of a preamble are transmitted responsive to a reference signal received power (RSRP) being less than a threshold and a random access (RA) procedure being initiated. A random access response (RAR) window is monitored for a random access radio network temporary identity (RA-RNTI) corresponding to the repeated transmissions of the preamble. In some implementations, each of the repeated transmissions of the preamble is transmitted based on a spatial filter that is different from others of the repeated transmissions of the preamble. In some implementations, each of the repeated transmissions of the preamble comprises a preamble index that is different from preamble indices of others of the repeated transmissions of the preamble. In some implementations, the spatial filter comprises a transmission (Tx) beam.

In some implementations, the bundle of repeated transmissions of the preamble comprises retransmissions of a msg1.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
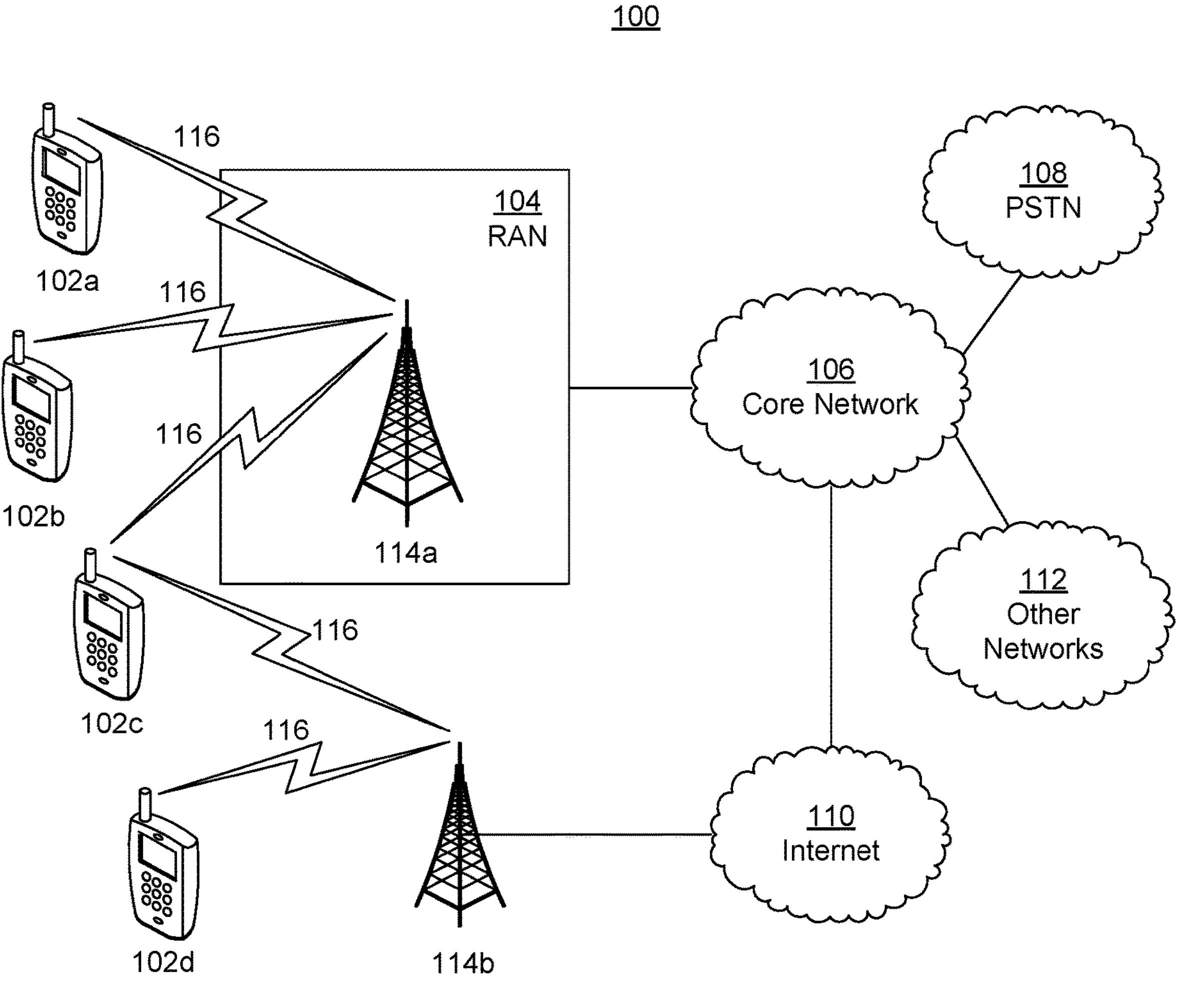
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. Coverage may include the uptake area of a cell, where a cell is considered the serving cell if measured by the WTRU as the strongest serving cell (based on RSRP or SS measurements). The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
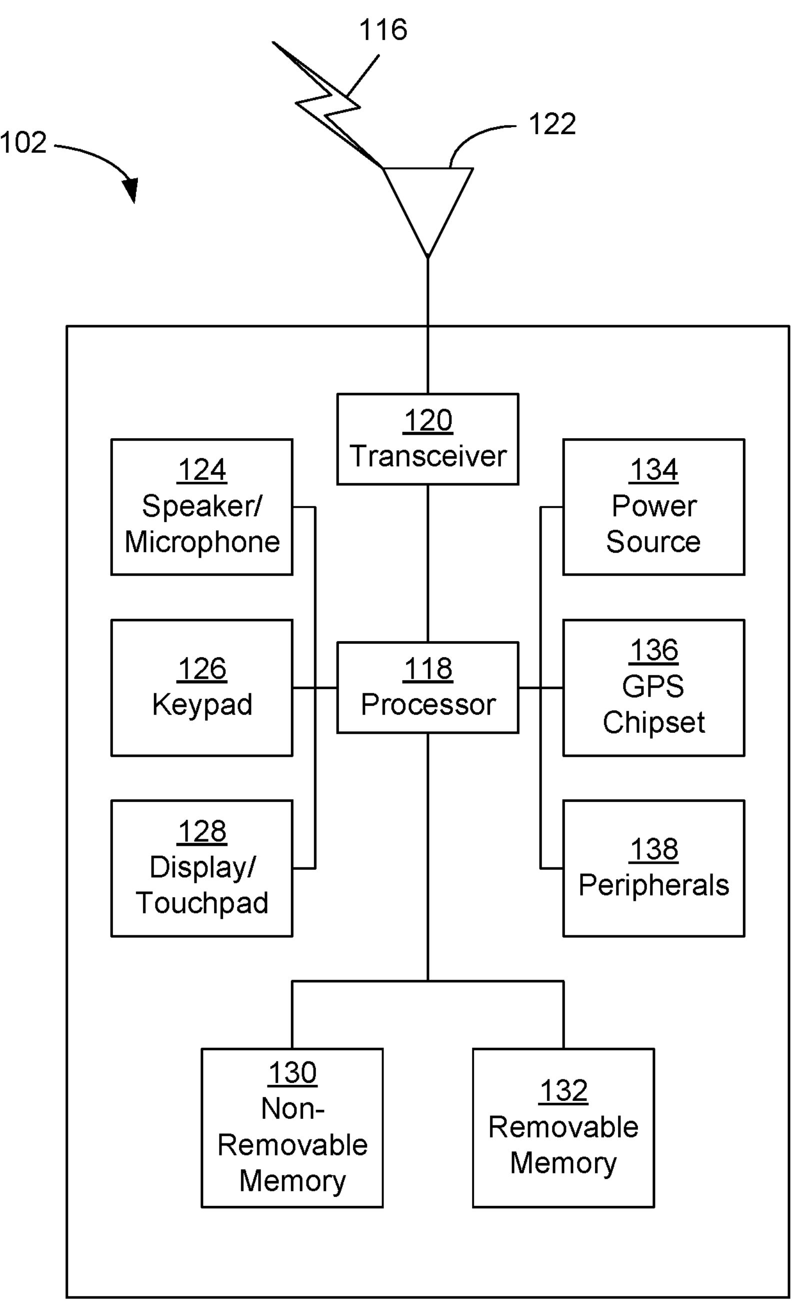
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
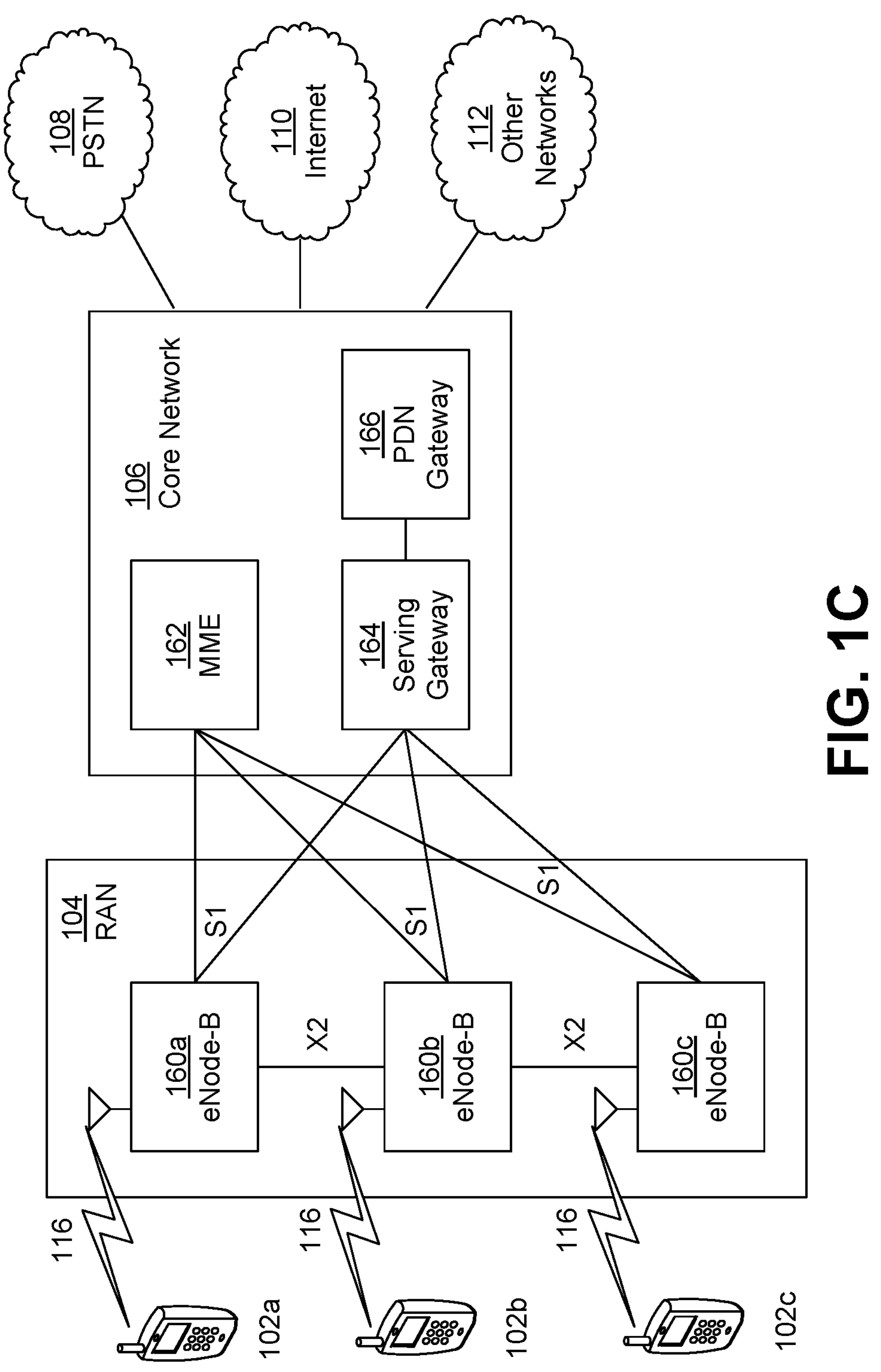
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
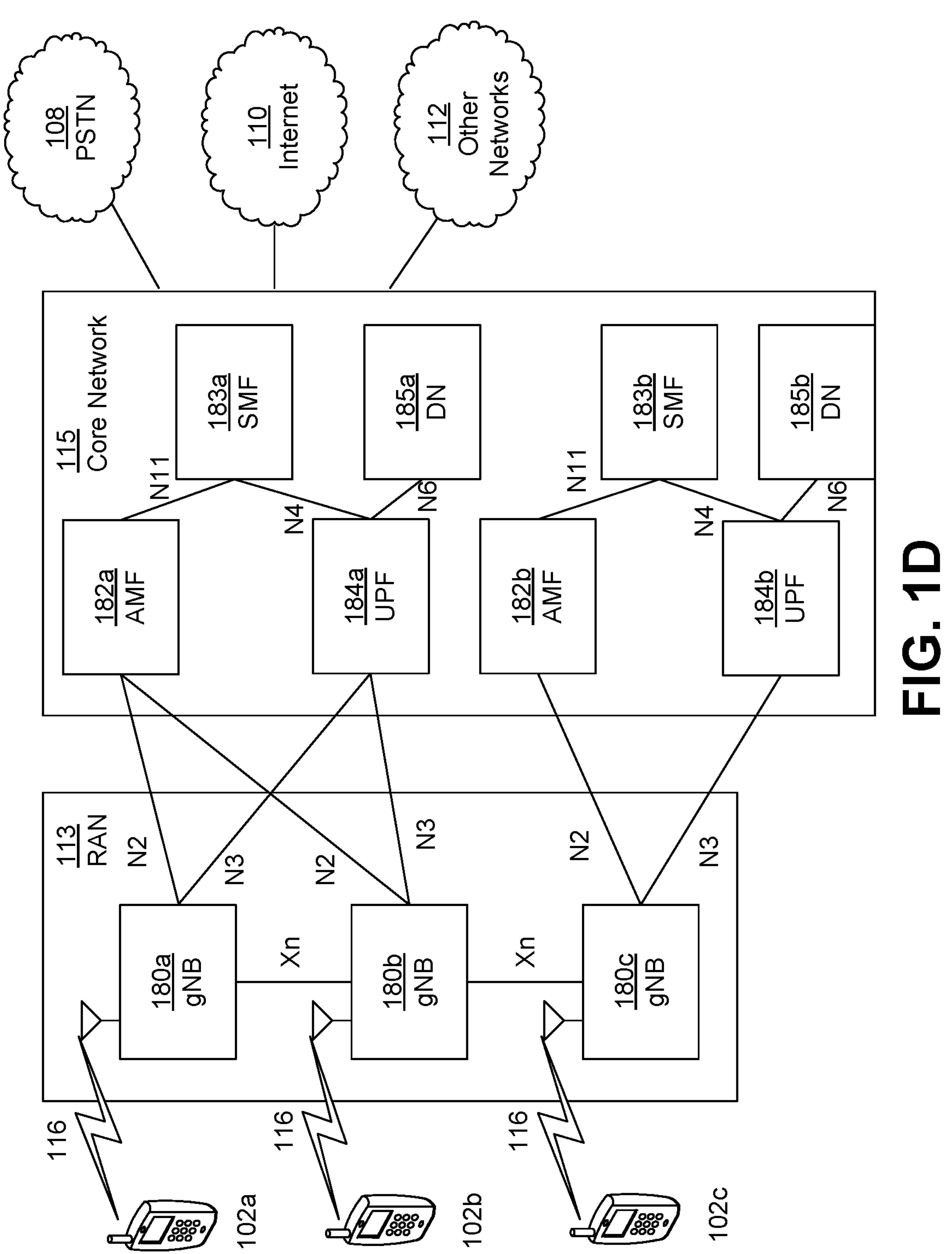
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms, among others, are used herein: Configured grant or cell group (CG); Dynamic grant (DG); Channel access priority class (CAPC); Downlink feedback information (DFI); HARQ Process ID (HARQ PID); enhanced Licensed Assisted Access (eLAA); Further enhanced Licensed Assisted Access (FeLAA); MAC control element (MAC CE); RACH occasion (RO); random access (RA); physical random-access channel (PRACH); Acknowledgement (ACK); Block Error Rate (BLER); Bandwidth Part (BWP); Channel Access Priority (CAP); Clear Channel Assessment (CCA); Cyclic Prefix (CP); Conventional OFDM, e.g., relying on cyclic prefix, (CP-OFDM); Channel Quality Indicator (CQI); Cyclic Redundancy Check (CRC); Channel State Information (CSI); Contention Window (CW); Contention Window Size (CWS); Channel Occupancy (CO); Downlink Assignment Index (DAI); Downlink Control Information (DCI); Downlink (DL); Demodulation Reference Signal (DM-RS); Data Radio Bearer (DRB); Hybrid Automatic Repeat Request (HARQ); License Assisted Access (LAA); Listen-Before-Talk (LBT); Long Term Evolution, e.g. from 3GPP LTE R8 and up (LTE); Negative ACK (NACK); Modulation and Coding Scheme (MCS); Multiple Input Multiple Output (MIMO); New Radio (NR); Orthogonal Frequency-Division Multiplexing (OFDM); Physical Layer (PHY); Physical Random Access Channel (PRACH); Primary Synchronization Signal (PSS); Random Access Channel (or procedure) (RACH); Random Access Response (RAR); Radio access network Central Unit (RCU); Radio Link Failure (RLF); Radio Link Monitoring (RLM); Radio Network Identifier (RNTI); Radio Resource Control (RRC); Radio Resource Management (RRM); Reference Signal (RS); Reference Signal Received Power (RSRP); Received Signal Strength Indicator (RSSI); Service Data Unit (SDU); Signal to Interference & Noise Ratio (SINR); Sounding Reference Signal (SRS); Synchronization Signal (SS); Secondary Synchronization Signal (SSS); Switching Gap (in a self-contained subframe) (SWG); Semi-persistent scheduling (SPS); Supplemental Uplink (SUL); Transport Block (TB); Transport Block Size (TBS); Transmission and Reception Point (TRP); Time-sensitive communications (TSC); Time-sensitive networking (TSN); Uplink (UL); Ultra-Reliable and Low Latency Communications (URLLC); Wide Bandwidth Part (WBWP); Wireless Local Area Networks and related technologies, e.g., in the IEEE 802.xx domain, (WLAN).

The following terminology may be used throughout this disclosure.

The term PRACH resource may be used to refer to a PRACH frequency resource. The term PRACH resource may be used to refer to a PRACH occasion (RO) (e.g., in time). The term PRACH resource may be used to refer to a preamble format (e.g., in terms of total preamble duration, sequence length, guard time duration and/or in terms of length of cyclic prefix), The term PRACH resource may be used to refer to a certain preamble sequence used for the transmission of a preamble in a random access procedure, a preamble signature, and/or the like.

The term Msg. 1 may be used to refer to the PRACH preamble transmission used to initiate a 4-step RACH procedure. The term Msg. 1 may be used interchangeably with the term preamble.

The term Msg. 2 may be used to refer to the random access response of the 4-step RACH procedure.

The term Msg. 3 may be used to refer to the WTRU transmission performed based on the uplink grant received in the random access response of the 4-step RACH procedure.

The term Msg. 4 may be used to refer to the network transmission used to contention resolution during a 4-step RACH procedure.

The term MsgA may be used to refer to the preamble on PRACH resources and payload transmissions on PUSCH resources in a 2-step random access procedure.

The term MsgB may be used to refer the downlink response to MsgA, which may be, for example, a success RAR, fallback RAR, or a backoff indication.

The acronym RO may be used herein. RO may refer to a RACH occasion.

A WTRU may be configured to determine channel conditions. The term channel conditions may be used to refer to any conditions relating to the state of the radio/channel. For example, channel conditions may be determined by the WTRU from one or more of a WTRU measurement (e.g., L1/SINR/RSRP, CQI/MCS, channel occupancy, RSSI, power headroom, exposure headroom, etc.), L3/mobility-based measurements (e.g. RSRP, RSRQ), a radio link monitoring (RLM) state, channel availability in unlicensed spectrum (e.g. whether the channel is occupied based on determination of an LBT procedure or whether the channel is deemed to have experienced a consistent LBT failure), and/or the like. A channel measurement refers to a WTRU measurement made using one or more of the aforementioned channel conditions.

The term a property of scheduling information (e.g., an uplink grant or a downlink assignment) may be used herein. A property of scheduling information may include one or more of the following: a frequency allocation; an aspect of time allocation, such as a duration; a priority; a modulation and coding scheme; a transport block size; one or more spatial layers; one or more transport blocks to be carried; a TCI state or SRI; one or more repetitions; and/or whether the grant is a configured grant type 1, type 2 or a dynamic grant.

The term an indication by DCI may be used herein. An indication by DCI may include one or more the following: an explicit indication by a DCI field or by RNTI used to mask CRC of the PDCCH; and/or an implicit indication by a property such as DCI format, DCI size, Coreset or search space, aggregation level, identity of first control channel resource (e.g., index of first CCE) for a DCI, e.g., where the mapping between the property and the value may be signaled by RRC or MAC.

In some implementations, Msg1 202 may be the first message in a RA procedure. In some implementations, Msg1 202 may include a random access preamble, a sequence, and/or a payload. In some implementations, the preamble may be generated from a cell-specific root sequence, where an offset transmission from the root sequence is used to generate a preamble. In some examples, Msg1 204 repetition may be a useful tool to enhance coverage, e.g., in 5G frequency ranges (e.g., FR1 and FR2.) For example, a WTRU may use different transmit (Tx) beams (also referred to as spatial domain filters, or spatial filters) to transmit different repetitions of msg1 202 and/or exploit channel diversity. In some implementations, the WTRU, additionally or alternatively, may transmit the repetitions using the same Tx beam; e.g., to allow the gNB to correlate and combine preambles from the same WTRU, to allow the gNB to sweep through receive (Rx) beams, and/or to allow the gNB to correlate the channel by demodulation reference signal (DMRS) or PRACH bundling.

In some implementations, decoding a single preamble out of a repetition of preambles may be sufficient to achieve coverage extension by leveraging channel diversity. In such implementations, a WTRU may transmit a bundle of msg1 202 repetitions (e.g., using different spatial filters), where one or more (e.g. any) RO 204 may be used (while still indicating that they indicated the selected synchronization signal block or blocks (SSB) per legacy behavior (e.g., according to earlier standards or standard versions)). In some examples, a bundle of msg 1 202 repetitions may include several repeated msg1 202 in succession (e.g. with or without gaps in time domain). In some implementations, Ros 204 may be shared with legacy WTRUs. For example, the network may configure, e.g., by broadcast or dedicated signaling, one or more (e.g. a maximum number of) msg1 202 repetitions per bundle (e.g., that can be repeated before expiry of a RAR window). If RSRP<Threshold and RA is initiated, the WTRU may repeat Msg1 202, and the WTRU may monitor RAR(s) for one or more RA-RNTIs if the Msg1 202 repetitions span more than one "RA-RNTI occasion" (e.g., more than one PRACH resource for which the RA-RNTI value is the same) in the time or frequency domains.

In some implementations, the gNB may benefit from knowing (e.g., be able to use information that the gNB has indicating) that Msg1 202 repetitions come from the same WTRU (e.g., for Rx beam sweeping), e.g., for better channel estimation, and/or for soft combining the received preamble. In some implementations, the network may configure, e.g., by broadcast or dedicated signaling, one or more (e.g. a) subset of Ros 204 (RO sets) on which msg1 202 may be repeated, possibly along with an indication of one or more (e.g. a maximum) number of repetitions or a bundle size. In some such implementations, if RSRP<a threshold and RA is initiated, the WTRU may repeat Msg1 202. In some implementations, the WTRU may transmit a bundle of msg1 202 repetitions (e.g., using different spatial filters) on an RO set 204 configured for Msg1 202 repetition. In some implementations, the WTRU may monitor RAR for the combined RA-RNTIs corresponding to the RO set, or an RA-RNTI corresponding to one or more of the ROs in the set (e.g., the first or the last RO in a set). In some implementations, one or more preambles or one or more RO partitioning may be required.

A WTRU may be configured to perform Msg1 repetition using on or more Msg1 repetition types. In some examples, Msg1 202 repetition types may include transmitting repetitions on the same tx beam (e.g. spatial filter) and same preamble index; transmitting repetitions on different tx beams but same preamble index; transmitting repetitions on same tx beam but different preambles indices; and/or transmitting repetitions on different tx beams and preambles indices, etc. Some possible parameters for each Msg1 202 repetition may include: Tx beam (e.g. spatial filter), preamble index, RO, PRACH resource, and/or Tx power, etc.

In some examples, one or more (e.g. a single) preamble transmission may not be sufficient for a preamble correlator (e.g., of a gNB) to correctly decode a WTRU's preamble; e.g., when the WTRU is in potentially insufficient (e.g. bad) coverage or radio frequency (RF) radio conditions.

In legacy NR networks, the WTRU may retransmit Msg1 202 of an RA procedure some time (e.g. only after) the expiry of the RAR (Msg2) monitoring window without receiving a response from the network. In some implementations, Msg2 may be the second message in a random access procedure, which the WTRU receives. In some implementations, the Msg2 may include a RAR, a backoff indication, system information configurations, a grant, a timing advance, a payload, and/or downlink data. Further, preamble retransmissions may be independent from the gNB's perspective and may not be able to (e.g. cannot) be combined with previously sent preambles for improving the gNB detection probability. Msg1 202 repetition may be helpful to increase the WTRU's link budget and/or increase the probability of Msg1 202 detection at the gNB (or other receiving device), as well as reducing the overall latency associated with random access for WTRUs in potentially insufficient (e.g. bad) coverage conditions.

As used herein, a WTRU may transmit or receive a physical channel or reference signal according to one or more spatial domain filters. The term "beam" may be used to refer to a spatial domain filter. Herein, the terms spatial filter and tx beam may be used interchangeably.

In some implementations, a WTRU may transmit a physical channel or signal using the same spatial domain filter as the spatial domain filter used for receiving an RS (such as CSI-RS) or a SS block. The WTRU transmission may be referred to as a "target", and the received RS or SS block may be referred to as a "reference" or "source". In some such implementations, the WTRU may be said to transmit the target physical channel or signal according to a spatial relation with a reference to such RS or SS block.

In some implementations, the WTRU may transmit a first physical channel or signal according to the same spatial domain filter as the spatial domain filter used for transmitting a second physical channel or signal. The first and second transmissions may be referred to as "target" and "reference" (or "source"), respectively. In some such implementations, the WTRU may transmit the first (target) physical channel or signal according to a spatial relation with a reference to the second (reference) physical channel or signal.

In some implementations, a spatial relation may be implicit, configured by RRC or signaled by MAC CE or DCI. For example, a WTRU may implicitly transmit PUSCH and DM-RS of PUSCH according to the same spatial domain filter as an SRS indicated by an SRI indicated in DCI or configured by RRC. In some implementations, a spatial relation may be configured by RRC for an SRS resource indicator (SRI) or signaled by MAC CE for a PUCCH. Such spatial relations may also be referred to as "beam indications".

In some implementations, the WTRU may receive a first (target) downlink channel or signal according to the same spatial domain filter or spatial reception parameter as a second (reference) downlink channel or signal. For example, such association may exist between a physical channel such as PDCCH or PDSCH and its respective DM-RS. Such association may exist if the WTRU is configured with a quasi-colocation (QCL) assumption type D between corresponding antenna ports, e.g., if the first and second signals are reference signals. Such association may be configured as a TCI (transmission configuration indicator) state. In some implementations, the WTRU may receive an indication of an association between a CSI-RS or SS block and a DM-RS, e.g., as an index to a set of TCI states configured by RRC and/or signaled by MAC CE. Such indication may also be referred to as a "beam indication".

Some implementations may provide coverage extension by Msg1 202 Repetition. For example, some implementations may include Msg1 202 Resource selection.

Some implementations may include non-partitioning based Msg1 202 repetition. For example, in some implementations, the WTRU may be configured with one set of PRACH preambles that the WTRU may use for both PRACH repetition mode (e.g., Msg1 202 repetition mode) and PRACH transmission without repetition mode (e.g., Msg1 202 without repetition mode).

In some implementations, the WTRU may be configured to repeat Msg1 202 on the same RACH Occasion (RO). For example, the WTRU may select and transmit using a plurality of (e.g. two) different PRACH resources belonging to the same RO. In an example, system information may be used to indicate whether repetition of Msg 1 202 should be performed. Upon receiving a system information block (SIB) indicating that repetition of Msg 1 202 should be performed, the WTRU may transmit Msg1 202 more than once (e.g., with repetition) within the same RO. In some implementations, the WTRU may be further configured with a group common DCI that may enable or disable Msg1 202 repetition in the same RO. In some implementations, the WTRU may be configured to monitor such group common DCI during initial access procedure.

In some implementations, the WTRU may be configured to repeat the Msg1 202 on different RACH Occasion (RO). In some such implementations, the WTRU may be configured with a set of RO allowed for repetitions. For example, if the WTRU selects a first PRACH resource in a first RO and if the WTRU is enabling Msg1 202 repetition, the WTRU may repeat the Msg1 202 transmission one or more times (e.g. only) in the set of allowed RO for repetitions. In some implementations, the set of allowed RO for repetitions may depend on the selected RO for initial Msg1 202 transmission. For example, the WTRU may use one or more (e.g. the only) RO associated with the same SSB used to determine PRACH resource for initial Msg1 202 transmission. In examples, the WTRU may be configured to use the RO associated with SSBs that are quasi-co located (QCL) with the SSB used to determine PRACH resource for initial Msg1 202 transmission.

In some implementations, the WTRU may be configured to repeat the same PRACH resource/preamble on different repetition occasions. In some implementations, the WTRU may be configured to use different PRACH resource in different occasions. In some implementations, the WTRU may be configured to use a mapping, function, and/or table to determine the PRACH resources for repetitions when enabling repetition of Msg1 202. For example, in some implementations, if the WTRU selects a PRACH resource (e.g. i) for an initial transmission of Msg1 202, the WTRU may use PRACH resources (e.g. $\{f_1(i), f_2(i), \ldots f_N(i)\}$) for one or more (e.g. N) repetitions respectively. In some implementations, the gNB (or other receiver) may determine if the received PRACH transmissions (e.g. $\{f_1(i), f_2(i), \ldots f_N(i)\}$) are correlated to determine whether Msg1 202 repetition occurred. The mapping, function, and/or table $f_1(.)$, $f_2(.)$, . . . $f_N(.)$ may be configured to the WTRU in any suitable manner, such as by RRC signaling or preconfigured/fixed, e.g., per an appropriate specification.

In some implementations, the WTRU may be configured to use a different PRACH target reception power $P_{PRACH,target}$ for each Msg1 202 repetition. In some implementations, the WTRU pattern of $P_{PRACH,target}$ in repetition occasions may aid the gNB in determining whether Msg1 202 repetitions occurred. In some implementations, the WTRU may be configured with $P_{PRACH,target}$ pattern for Msg1 202 repetition using SIB signaling or can be fixed in the specification.

In some implementations, the WTRU may be configured to use beam sweeping for Msg1 202 repetition, or the WTRU may be configured to not use beam sweeping for Msg1 202 repetition. In some implementations, the WTRU may be configured explicitly to use beam sweeping or not using broadcasted system information. In some implementations, the WTRU may be configured to determine whether beam sweeping for Msg1 202 repetition is enabled or not based on whether the bundling of PRACH and/or DMRS of Msg3 206 is enabled. In examples, Msg 3 may be the third message in a random access procedure. In some implementations, the WTRU may transmit the Msg3 206. In examples, the Msg3 206 may include an RRC connection request, UL data, and/or other control information. In some implementations, the WTRU may be configured to use beam sweeping for Msg1 202 repetition in a subset of ROs. In some implementations, the WTRU may be configured with a sweeping beam pattern for Msg1 202 repetition.

Some implementations may include partitioning based Msg1 202 repetition. For example, in some implementations, the WTRU may be configured with a first set of PRACH preambles which the WTRU may use for PRACH repetition mode (e.g., Msg1 202 repetition mode) and a second set of PRACH preambles that the WTRU may use for PRACH transmission without repetition mode (e.g., Msg1 202 without repetition mode). In some implementations, for operation in Msg1 202 repetition mode, the WTRU may be configured with a time pattern for repetition associated with the set of PRACH preambles configured for Msg1 202 repetition. In some implementations, the WTRU may repeat the selected PRACH resource according to the configured time pattern. In some implementations, the WTRU may be configured with a periodicity associated with a set of PRACH preambles configured for Msg1 202 repetition. In some implementations, the WTRU may repeat the selected PRACH resource according to the configured periodicity.

In some implementations, the WTRU may be configured with one or more sets of PRACH preambles for one or more SSBs used, transmitted, and/or monitored in the cell, wherein each set of PRACH preamble(s) may be associated with a coverage level. In some implementations, the WTRU may perform measurement and/or detection of one or more SSBs used, transmitted, and/or monitored in the cell, and the WTRU may determine an SSB and/or a coverage level based on the measurement and/or detection. Based on the determined SSB and coverage level, the WTRU may determine a set of PRACH preambles associated with the SSB and coverage level determined. In some implementations, the WTRU may perform PRACH transmission using the determined set of PRACH preambles repetitively. In some implementations, the number of sets of PRACH preambles and/or the number of coverage levels supported may be different based on SSB or SSB index. In some implementations, a set of PRACH preambles may include one or more PRACH preambles for the repetitions required to meet a certain coverage level. In some implementations, a WTRU may determine a subset of SSBs based on the coverage level determined.

In cases where the number of sets of PRACH preambles and/or the number of coverage levels supported may be different based on SSB or SSB index, for example, a first set of SSBs may support a first number of coverage levels (e.g., 1, 2, 3, 4, 5) and a second set of SSBs may support a second number of coverage levels (e.g., 1, 2, 3), wherein a coverage level may correspond to a repetition number. In examples, a first subset of SSBs may be with PRACH repetition mode (e.g., Msg1 202 repetition mode) and a second subset of SSBs may be without PRACH repetition mode (e.g., Msg1 202 without repetition).

In cases where a set of PRACH preambles may include one or more PRACH preambles for the repetitions required to meet a certain coverage level, the set of PRACH preambles may be a set of PRACH resources at different time locations; a same PRACH preamble sequence may be used in different time/frequency locations for repetitions; and/or each set of PRACH preambles may correspond to a coverage level and/or repetition numbers.

Some implementations may include PRACH repetition modes (partitioning or non-partitioning). In examples, the WTRU may determine a PRACH repetition mode based on an SSB (or SSB-id), wherein a first PRACH repetition mode may be non-partitioning based Msg1 202 repetition and a second PRACH repetition mode may be partitioning based Msg1 202 repetition. In some implementations, the WTRU may determine an SSB among one or more SSBs used, transmitted, or detected in a cell and the WTRU may use the associated PRACH repetition mode of the WTRU if the WTRU needs to perform coverage enhancement. In some implementations, the WTRU may determine a PRACH repetition mode based on the WTRU capability (e.g., whether beam correspondence is supported or not), and the WTRU may determine an SSB within the set of SSBs associated with the determined PRACH repetition mode.

In some implementations, an SSB may be associated with two PRACH resource types, wherein a first PRACH resource type may be associated with a first PRACH repetition mode (e.g., non-partitioning based Msg1 202 repetition) and a second PRACH resource type may be associated with a second PRACH repetition mode (e.g., partitioning based Msg1 202 repetition). In some implementations, the WTRU may determine a PRACH repetition mode based on one or more of following: a measurement of the SSB, one or more SSBs which meets one or more predetermined conditions, and/or a WTRU capability.

In cases where the WTRU determines a PRACH repetition mode based on a measurement of the SSB, for example, if the measurement quality of the associated SSB is below a threshold, the WTRU may determine the first PRACH resource type; otherwise, the WTRU may determine the second PRACH resource type.

In cases where the WTRU determines a PRACH repetition mode based on one or more SSBs which meets one or more predetermined conditions, the predetermined conditions may include one or more of the following: reception quality (e.g., L1-RSRP, L1-SINR) higher than a threshold; number of coverage levels supported; degree of (e.g. maximum) coverage level supported (e.g., based on BLER, SINR, or RSRP); and/or support for PRACH preamble repetitions.

In cases where the WTRU determines a PRACH repetition mode based on a WTRU capability, the WTRU capability may include, for example, whether the WTRU has beam correspondence capability or not. For example, if the WTRU has beam correspondence capability, the WTRU may determine to use partitioning based Msg1 202 repetition; otherwise, the WTRU may determine to use non-partitioning based Msg1 202 repetition.

A WTRU may be configured to receive multiple SSBsn. Some implementations may include an indication of multiple SSBs. For example, the WTRU may be configured with an association between SSB and PRACH resource (e.g., set of ROs and/or preambles). In some implementations, the WTRU may be configured with one or more (e.g. a maximum number) "N" of SSBs to indicate as part of a msg1 202 repetition bundle. In some implementations, the WTRU may measure one or more SSBs and select one or more SSBs that are measured with an RSRP above a configured (e.g., preconfigured) SSB-rsrp threshold. In some implementations, for a msg2 repetition bundle, the WTRU may select PRACH resources (e.g., ROs and/or preambles) associated with the selected N measured SSBs (e.g., N SSBs with the strongest signal strength measurements), or SSBs<=N that are measured with an ssb-rsrp>the configured threshold. In some implementations, the WTRU may change spatial filters associated with each beam pair. For example, in a case where the WTRU has selected SSBs 3, 4, and 5 as the strongest SSBs, the WTRU may repeat msg1 202 on ROs associated with SSBs 3, 4, and 5, and the WTRU may select a spatial filter associated with each selected beam. In some implementations, the WTRU may adjust or compensate the preamble transmit power or the preamble target receive power according to the measured pathloss associated with the selected beam pair (e.g., the selected SSB and/or the selected spatial filter/Tx beam).

In some implementations, the WTRU may select multiple SSBs that are consecutive in time. For example, the WTRU may repeat msg1 202 on ROs corresponding to multiple SSBs selected if there are no gaps in time domain associated with their SSB reception time. In some implementations, the WTRU may repeat msg1 202 on ROs corresponding to multiple SSBs selected if the ROs associated with the selected SSBs are consecutive in time domain (e.g. without RO gaps).

In some implementations, the WTRU may be configured with a threshold, and the WTRU may select multiple SSBs such that combined ssb-rsrp is greater than the threshold. For example, in an coverage limited scenario, the WTRU may not be able to find any ssb-rsrp that is greater than the configured threshold. In this case, in some examples, the WTRU may determine to select multiple SSBs such that their combined ssb-rsrp is greater than the threshold. In some implementations, such threshold may be configured separately from the threshold used in a standard initial access procedure, e.g., since the threshold is intended to be compared against the combined RSRP of SSBs. For example, the WTRU may select SSBs 3, 4, and 5 such that combined ssb-rsrps of ssb-rsrp corresponding to SSB3, SSB4 and SSB5 is greater than the threshold. In some implementations, the WTRU may change spatial filters associated with each beam pair. For example, in a case where the WTRU has selected SSBs 3, 4, and 5 as the SSBs (e.g., based on measurements); in some implementations, the WTRU may repeat msg1 202 on ROs associated with SSBs 3, 4, and 5, and in some implementations the WTRU may select a spatial filter associated with each selected beam.

In some implementations, the WTRU may be preconfigured with combinations of SSBs to select from if the WTRU is configured with one or more (e.g. a maximum number) "N" of SSB to indicate part of a msg1 202 repetition bundle. In some implementations, the WTRU may be preconfigured with groups of SSB IDs (e.g., [1,3,5], [2,4,6]). In this example, if the WTRU is configured with N=3, the WTRU may measure RSRP of SSB1, SSB3 and SSB5. Additionally or alternatively, the WTRU may measure RSRP of SSB2, SSB4 and SSB6. The WTRU may calculate combined RSRP for each group of SSBs, [SSB1, SSB3, SSB5] and [SSB2, SSB4, SSB6] and the WTRU may determine to use the group of SSBs with the highest combined RSRP for diversity transmission. The WTRU may determine to use the selected group of SSBs if the combined RSRP is above the preconfigured threshold. Additionally or alternatively, in some implementations, the WTRU may determine the group of SSBs for diversity transmission depending on the number of SSBs whose RSRP is above the preconfigured threshold. In examples, combinations of SSB IDs may be mutually exclusive, e.g., [1 2], [3 4] or overlapping combinations e.g., [1 2 3], [2 3 4]. Examples of diversity transmission schemes may include examples used herein, (e.g., the WTRU may repeat msg1 202 on ROs associated with selected group of SSBs; the WTRU may select a spatial filter associated with each selected beam, etc.)

In some implementations, the WTRU may select one or more (e.g. multiple) SSBs. If the one or more (e.g. multiple) SSBs have a combined RSRP that is greater than the preconfigured threshold, the WTRU may determine to perform a 2-step RACH; e.g., the WTRU may determine to send both PRACH preamble and msg3 206 using the diversity schemes explained herein. In examples, the WTRU may have selected SSBs 3, 4, and 5 as the SSBs (e.g., based on measurements). In some implementations, the WTRU may repeat msg1 202 and msg3 206 on ROs associated with SSBs 3, 4, and 5. Additionally or alternatively, the WTRU may select a spatial filter associated with each selected beam.

Some implementations may include Msg2 monitoring and coverage extension. For example, some implementations may include RA-RNTI monitoring. In some implementations, WTRU may monitor PDCCH for the reception of one or multiple Msg2s after transmission of a msg1 202 repetition bundle, the. In some implementations, the WTRU may monitor PDCCH for the reception of one or more (e.g. multiple) RARs, possibly multiplexed in the same Msg2. In some implementations, the WTRU may monitor for one or more (e.g. multiple) PDCCHs or one or more (e.g. multiple) Msg2s scrambled with one or more RA-RNTI; e.g., if the transmitted msg1s 202 span more than one of PRACH resources associated with a different RA-RNTI value.

In some implementations, for a msg1 202 repetition bundle transmitted on a set of ROs pre-configured for preamble repetition, the WTRU may monitor PDCCH on a combined RA-RNTI that is associated with the RO set. For example, the combined RA-RNTI may be computed based on the RA-RNTI values associated with each RO on which msg1 202 was repeated. In examples, the combined RA-RNTI may correspond to RA-RNTI value of the first or the last RO associated with the RO set.

In some implementations, among a plurality of received RARs the WTRU may select a single RAR and discard the remaining RARs. In some implementations, the WTRU may implicitly or explicitly indicate in the RAR that the other RARs were due to the transmission of a msg1 202 repetition bundle coming from the same WTRU.

Some implementations may relate to Msg3 206 repetition. For example, among a plurality of received RARs, in some implementations, the WTRU may use multiple grants to transmit msg3 206 from the signaled multiple RARs. In some implementations, for the transmission of msg3 206, the WTRU may consider grants in RARs received scrambled by an RA-RNTI(s) that corresponds to the ROs on which msg1 202 was repeated.

Figure 2:
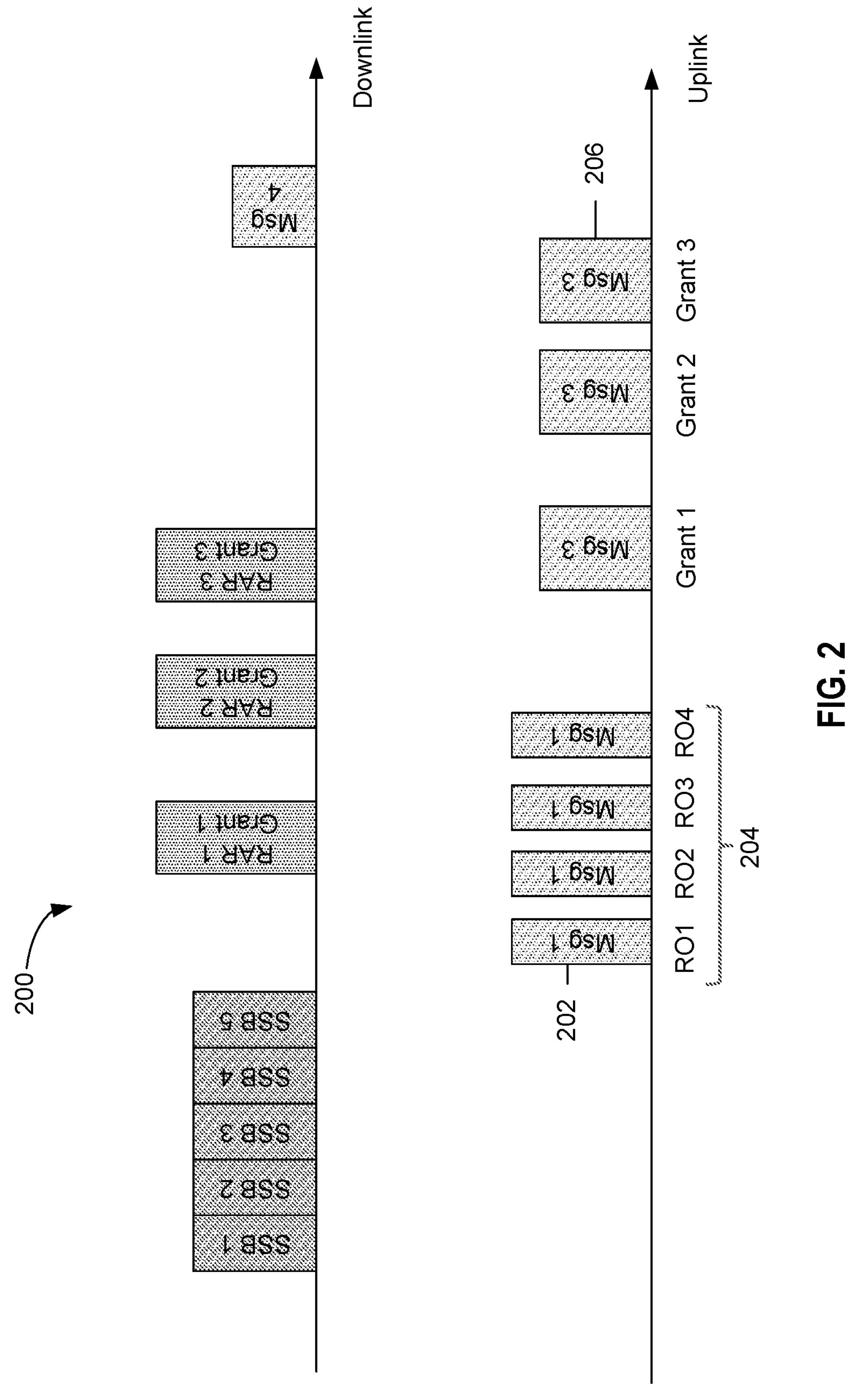
FIG. 2 is a graph illustrating example aspects of the invention which may be implemented.

In some implementations, the WTRU may use the plurality of selected grants to transmit repeated copies of a single TB. For grants of the same TBS and/or that may not (e.g. do not) overlap in the time domain, in some implementations, the WTRU may use the grants for msg3 206 repetition. In some implementations, the WTRU may indicate the number of grants used to repeat msg3 206, e.g. in the first copy. In some implementations, the WTRU may use one or more (e.g. all) of the grants with the same TBS to repeat the Msg3 206 TB. FIG. 2 is a graph illustrating a general scenario for an RA procedure initiated with Msg 1 202 coverage extension by msg 1 202 repetition. FIG. 2 depicts Msg 4 as the fourth message in the RA procedure.

In some implementations, the WTRU may use the plurality of selected grants to transmit multiple TBs, either on different HARQ processes or on a single HARQ process. For the determination of the different HARQ process IDs, in some implementations, the WTRU may determine the HARQ process associated with each grant according to the RAR reception time. For example, in some implementations, the WTRU may associate the first grant received in time with HARQ process 0, the second grant received with HARQ process 1, the third grant received with HARQ process 2 and so on. Additionally or alternatively, in some implementations, the WTRU may determine the HARQ process ID from the RAR reception time occasion (e.g., the slot number), the SSB associated with the RAR (or the RO associated with the SSB), or the time offset from the SSB transmission time.

In some implementations, the WTRU may use the plurality of selected grants to transmit TB segments on a single HARQ process (e.g. HARQ process 0). In some implementations, the WTRU may segment a msg3 206 TB into multiple segments and transmit them over the received grants on Msg2(s) scrambled by the RA-RNTI(s) associated with the msg1(s) 202 transmitted. In some implementations, multiple smaller grants may be beneficial for Msg3 206 coverage enhancements. In some implementations, the WTRU may also consider the TB transmission as a TB transmitted over multiple slots, where each slot corresponds to a different grant.

For grants that overlap in the time domain, in some implementations, the WTRU may select a single grant and discard the remaining overlapping grant or grants. Among a plurality of signaled grants associated with monitored RA-RNTI(s), if one or more of the grants is signaled with msg3 206 repetition, in some implementations, the WTRU may prioritize the selection of such grant and/or may discard one or more other grants without repetition.

Among a plurality of signaled grants associated with monitored RA-RNTI or R-RNTIs, in some implementations, the WTRU may select the grant that is most appropriate to the WTRU's coverage and/or measured pathloss. For example, in some implementations, the WTRU may select a grant with a TBS above a preamble group B TBS threshold if the measured pathloss is less than a configured threshold (e.g., the pathloss threshold associated with selected preamble group B), and/or discard the grant otherwise.

In some implementations, among a plurality of signaled grants associated with monitored RA-RNTI or RA-RNTIs, the WTRU may select the grant which has more available symbols or slots for uplink transmission such that the WTRU has more opportunities for repetition transmission in the selected grant.

Some implementations may include, in Msg2, an indication of the Tx beam/RO to use in Msg3 206. In some implementations, the WTRU may be configured with a RAR reception time associated with one or more SSB. For example, in some implementations, the WTRU may monitor for a Msg2 associated with a certain SSB indicated part of a msg1 202 repetition bundle, in a certain subset of slots, within a certain offset/window from the SSB transmission time, and/or within a certain offset/window from the RO occasion time used to indicate the associated SSB. In some implementations, the WTRU may select the RAR that corresponds to the strongest measured SSB (e.g., highest power reception levels), possibly after the expiry of the RAR window, after reception of multiple Msg2 or RARs. In some implementations, selecting the RAR that corresponds to the strongest measured SSB may facilitate the gNB in implicitly refining the strongest beam pair. In some implementations, the WTRU may select the spatial filter used for transmission of msg3 206 according to the SSB associated with the RAR and/or the beam pair.

Among a plurality of signaled grants associated with monitored RA-RNTI or RA-RNTIs, in some implementations, the WTRU may select a grant according to the strongest measured SSB, (e.g. in some implementations, only among the SSB(s) indicated in the msg1 202 repetition bundle). For example, in some implementations, the WTRU may select the grant signaled in the RAR associated with the strongest measured SSB; e.g., when some RARs are associated with one or more SSBs. Among a plurality of signaled grants associated with monitored RA-RNTI or RA-RNTIs, in some implementations, the WTRU may select a grant according to the strongest spatial filter. For example, in some implementations, the WTRU may determine an SSB and/or spatial filter associated with each grant signaled in each RAR, either implicitly (e.g., from a property of the scheduling information) or explicitly (e.g., from an indication in the DCI or the contents of the RAR). In some implementations, the WTRU may select the grant associated with the strongest measured SSB from the plurality of grants and/or may discard one or more other grants.

In some implementations, the gNB (or other receiver—gNB may be used for example throughout) may signal the strongest Tx beam/RO in Msg2 to use in Msg3 206 explicitly or implicitly. In some implementations, the RAR may indicate the RO or the Tx beam or beams used to decode the preamble, which in some implementations, the WTRU may use to transmit Msg3 206. In some implementations, the RAR may indicate whether the WTRU uses one or more of the indicated beams for msg3 206 repetition or sweeps through one or more configured or indicated beams. In some implementations, the gNB may signal the strongest tx beam/RO in Msg2 to use in Msg3 206 implicitly, e.g. based on: a random access preamble identity (RAPID) indicated in RAR (e.g. if different preamble indices are used), RA-RNTI (e.g. if the different msg1 202 reps are on different RNTI Ros), and/or the timing of RAR reception (e.g., slot used to receive RAR, time offset between Msg1 202 and Msg2, or the associated SSB).

In some implementations, the WTRU may determine the strongest tx beam/RO in Msg2 to use in Msg3 206 explicitly or implicitly. RAR may indicate the RO or the Tx beam(s) used to decode the preamble, which the WTRU may uses to transmit Msg3 206. RAR may indicate whether the WTRU uses the indicated beams for msg3 206 repetition or sweeps through one or more configured or indicated spatial filters. The WTRU may determine the strongest tx beam/RO in Msg2 to use in Msg3 206 implicitly, e.g. based on: RAPID indicated in RAR (e.g. if different preamble indices are used), RA-RNTI (e.g. if the different msg1 202 reps are on different RNTI Ros), and/or the timing of RAR reception (e.g. slot used to receive RAR, time offset between Msg1 202 and Msg2, or the associated SSB). The WTRU may also determine the strongest tx beam from a field of the DCI indicating the RAR or a field of the random access grant carried in the RAR.

Some implementations may include RAR combining (e.g., monitoring for multiple RARs). For example, some implementations may include a RAR monitoring window. In some implementations, the WTRU may start the RAR monitoring window after the transmission of the first repetition, possibly if the repetitions are not transmitted by PRACH resource configured separately by the gNB for msg1 202 repetition. In some implementations, the WTRU may start or restart the RAR window after the transmission of each msg1 202 repetition. Additionally or alternatively, in some implementations, the WTRU may start the RAR window some time (e.g. only) after the transmission of the last repetition. Additionally or alternatively, in some implementations, the WTRU may start the RAR window after the last repetition of using same beam. Additionally or alternatively, in some implementations, the WTRU may start the RAR window after the last repetition of using same msg1 202 repetition bundle.

In some implementations, the WTRU may stop the RAR window (and/or PDCCH monitoring) after successful reception of any RAR. Additionally or alternatively, in some implementations, the WTRU may stop the RAR window after receiving a predefined or configured number of RARs. In some implementations, the number of RARs to monitor may be determined dynamically based on the number of indicated SSBs (e.g., the number of preambles transmitted on Ros mapped to different SSBs).

Some implementations may include Msg2 Coverage enhancement. For example, in some implementations, the WTRU may soft-combine RAR/Msg2, e.g., for RARs received scrambled with RA-RNTI or RA-RNTIs used to transmit one or more Msg1s 202. In some implementations, soft combining may be an error correction technique in which bad packets are not discarded but stored in a buffer. For example, two or more packets received with insufficient information may be combined together in such a way that total signal can be decoded. In some implementations, the WTRU may receive multiple repetitions of PDCCH signaling Msg2 and/or PDSCH repetitions for the Msg2 payload. In some implementations, the gNB may mirror the diversity expressed by the WTRU in msg1 202; e.g., whereby the WTRU may receive RARs for SSBs associated with Ros on which msg1 202 was repeated. In some implementations, multiple DL beams corresponding to the indicated UL Tx beams swept may be used for diversity of RAR.

Some implementations may relate to the impact of Msg1 202 repetition on the RA Procedure. Some such implementations may include RA procedure initiation. For example, in some implementations, the WTRU may initiate a RA procedure with msg1 202 repetition if the measured DL RSRP (or channel condition) is less than a configured threshold; e.g., the threshold configured for msg3 206 repetition. In some implementations, the WTRU may first compare the measured RSRP with the threshold configured for supplementary uplink carrier (SUL) vs. normal uplink carrier (NUL) (e.g., perform carrier selection first), then compare the respective measured RSRPs with the threshold for msg1 202 or msg3 206 repetition. In some implementations, the WTRU may select an PRACH resource associated with and/or configured for msg1 202 repetition after initiation of a RA with msg1 202 repetition; the WTRU may some times (e.g. only) select from preambles configured for group A; and/or the WTRU may ignore the selection criterion for preambles group A/B and some times (e.g. only) select any preamble part of groups A or B.

In some implementations, the WTRU may start a PRACH repetition procedure using a single preamble without repetition, but may switch to multi-msg1 202 repetition, e.g., if the number of retransmissions (or the preamble transmission counter) is above a configured or predefined threshold. In some implementations, the WTRU may start a PRACH repetition procedure using preamble repetition, but may switch to sub-PRB PRACH preamble transmission if the number of retransmissions (or the preamble transmission counter) is above a configured or predefined threshold.

Some implementations may include power ramping. For example, in some implementations, the WTRU may power ramp after RAR window expiry. Additionally or alternatively, in some implementations, the WTRU may power ramp after retransmission of the same beam, whereby in some implementations, the WTRU sweeps through one or more (e.g. all) Tx beams before power ramping. Additionally or alternatively, in some implementations, the WTRU is configured with one or more Tx beams (e.g. spatial filters) to sweep prior to power ramping. In some implementations, the WTRU may not be allowed to change beams until the WTRU finishes power ramping (or configured number of reps) using the same beam.

Some implementations may include a PRACH beam set. For example, in some implementations, the WTRU may perform PRACH repetition within a configured or indicated set of beams. Such set of beams may be referred to a PRACH beam set in the following. The set of beams may be indicated based on one or more of the following: a subset of SSB's of the cell; a set of RS such as CSI-RS or SRS (e.g., indicated using CRI or SRI); and/or a set of TCI states, e.g., indicated using a TCI state identity or from an index for indicating one of a possible subset of TCI states.

In some implementations where the set of beams is indicated as a set of CSI-RS, SRS or TCI states, the WTRU may determine an association between each such CSI-RS, SRS or TCI state and a SSB or PRACH occasion for the purpose of selecting an appropriate PRACH occasion. In some implementations, the WTRU may obtain a PRACH beam set and association with SSB or PRACH occasion explicitly from RRC, MAC CE or DCI. For example, in some implementations, the WTRU may receive a PDCCH order for RACH indicating such PRACH beam set. In some examples, the WTRU may receive a MAC CE indicating a subset of TCI states for PRACH beam set.

In some implementations, the WTRU may obtain a PRACH beam set implicitly from another configuration aspect. For example, in some implementations, the PRACH beam set may implicitly correspond to a set of TCI states used for PDCCH reception or PDSCH reception. In some examples, the PRACH beam set may implicitly correspond to a set of periodic and/or aperiodic SRS resources configured for the WTRU. In some implementations, the PRACH beam set may correspond to a set of beams configured as candidate RS as part of a beam failure recovery configuration.

Some implementations may include determination of beam repetition mode and PRACH beam set. The following example implementations facilitate the WTRU in determining a PRACH beam repetition mode. In some implementations, a PRACH beam repetition mode may determine whether the WTRU performs PRACH repetition or not. In some implementations, a PRACH beam repetition mode may determine whether the WTRU performs PRACH repetition using a single beam or more than one beam. In some implementations, a PRACH beam repetition mode may determine the number of beam or maximum number of beams for PRACH repetition. In some implementations, a PRACH beam repetition mode may determine whether the WTRU selects the at least one beam for PRACH repetition from any SSB or from an indicated or configured set of beams such as a PRACH beam set. In some implementations, a PRACH beam repetition mode may determine the identity of one or more beam for PRACH repetition, such as a PRACH beam set.

In some implementations, the WTRU may determine a PRACH beam repetition mode and/or PRACH beam set based on which event triggers initiation of a random access procedure. Some implementations may include one or more of the following: a system information (SI) request, beam failure recovery, reconfiguration with sync (handover), initial access, connection re-establishment, DL or UL data arrival, SR failure, transition from RRC_INACTIVE state, establishment of time alignment for a secondary TAG, consistent UL LBT (listen-before-talk) failure, and/or PDCCH order.

In some implementations, the WTRU may determine a PRACH beam repetition mode as a function of random access type, such as whether the WTRU performs a 4-step random access procedure (type A) or 2-step random access procedure (type B), or whether the random access is contention-free or contention-based.

In some implementations, the WTRU may determine a PRACH beam repetition mode based on explicit signaling. For example, in some implementations, an information element of a PRACH configuration may indicate a PRACH beam repetition mode. In some implementations, the WTRU may receive a MAC CE indicating a PRACH beam repetition mode. In some implementations, the WTRU may receive a PRACH beam repetition mode from a PDCCH order for RACH.

In some implementations, the WTRU may determine a PRACH beam repetition mode based on one or more measurements, such as RSRP, path loss or RSRQ from one or more RS. In some implementations, the WTRU may determine a first PRACH repetition mode (e.g., no repetition mode) if one or more measurement results are above a threshold and/or a second PRACH repetition mode (e.g. PRACH repetition with N repetitions mode) if one or more (e.g. all) measurements result are below a threshold. In some implementations, the one or more RS may correspond to RS configured or indicated as PRACH beam set. In some implementations, the threshold may be configured or indicated by RRC or MAC.

Some implementations may include incrementing a preamble Tx counter, or otherwise tracking one or more preamble Tx. For example, for a RA procedure initiated with msg1 202 repetition, in some implementations, the WTRU may increment the preamble Tx counter (or otherwise adjust tracking of the number of preamble Tx) by one or more of the following methods: some time (e.g. only) after expiry of RAR window for a msg1 202 retransmission; after each repetition/preamble transmission; after the transmission of a complete repetition bundle, where one bundle can be configured or predefined; and/or after transmission of a configured or predefined number of preamble copies.

In implementations where the counter or other tracking is incremented or otherwise adjusted after the transmission of a complete repetition bundle, where one bundle may be configured or predefined, for example, a bundle may contain a sweep of a configured number of beams/ROs or one or more reps using the same beam. In implementations where the counter or other tracking is incremented or otherwise adjusted after transmission of a configured or predefined number of preamble copies, for example, the WTRU may increment the counter (or adjust the tracking) after every 3 repetitions, where x is configured, predefined or in broadcast signaling.

Some implementations may include a new counter or other tracking to control the number of msg repetitions. For example, in some implementations, the WTRU may maintain an additional new "msg1 repetition counter" (or other tracking variable or mechanism, etc.) on top of the preamble transmit counter to maintain the number of repetitions. In some implementations, the WTRU may increment the counter (or increment or adjust another tracking mechanism) after the transmission of each msg1 202 repetition. In some implementations, the WTRU may reset the counter (or other tracking mechanism) based on reception of RAR or backoff or starting a new rep bundle or upon expiry of the RAR window (preamble retransmission). In some implementations, the WTRU may not increment the counter (or increment or adjust another tracking mechanism) for skipped transmissions of preamble repetitions, e.g., due to LBT failure or cancelled UL slots (e.g., due to receiving inter-WTRU cancellation signaling or due to intra-WTRU prioritization for another uplink signal over PRACH).

In some implementations, the WTRU may be predefined or configured by broadcast or dedicated signaling with a parameter (e.g., Msg1maxRep) indicating an amount (e.g. maximum number) of msg 1 202 repetitions per bundle (e.g., before expiry of RAR window), one or more repetitions per beam, an amount (e.g. maximum) number of repetitions per preamble index, and/or one or more repetitions before power ramping. In some implementations, the WTRU may terminate the transmission of msg1 202 transmissions after transmitting Msg1maxRep, e.g., if the msg1 202 repetition counter (or other tracking) is larger than or equal to Msg1maxRep. In some implementations, the WTRU may reset the msg1 202 transmission counter (or other tracking) if the repetition and/or transmission counter is larger than or equal to Msg1maxRep.

Some implementations may include a backoff indication. For example, in some implementations, the WTRU may be configured with a separate or differentiated backoff value, which the WTRU may use if a RA procedure with msg1 202 repetition is initiated. For a RA procedure initiated with msg1 202 repetition, in some implementations, the WTRU may receive an indication to modify the number of repetitions per bundle (or more generally Msg1maxRep), where the indication can be signaled part msg2 contents (e.g., part of the backoff indication). In some implementations, the WTRU may receive an enhanced backoff indication (BI) with indication to backoff or remove certain Tx beams (or spatial filters) from the next preamble retransmission bundle and/or to modify the configured set of beams on which the WTRU sweeps part of a msg1 202 repetition bundle. In some implementations, the WTRU may be signaled a modified number of repetitions per bundle in the enhanced BI, after reception of which the WTRU performs preamble retransmissions with modified number of repetitions per bundle. In some implementations, the WTRU may receive an indication in msg2 contents or in the BI, after reception of which the WTRU may terminate early the transmission of remaining repetitions in a msg 1 202 repetition bundle.

In some implementations, the WTRU may receive an enhanced BI indicating a switch to the SUL for a preamble retransmission, after reception of which the WTRU may abort the ongoing RA procedure and start a new one on the SUL carrier. In some implementations, the WTRU may receive an enhanced BI indicating a switch to sub-PRB PRACH preamble retransmission.

The WTRU may receive a backoff indication indicating a specific TRP to retransmit the preamble on, and/or retransmit the preamble on PRACH resources associated with the indicated PRACH resource. The WTRU may receive an indication of backoff relating to one or more of the repetitions the WTRU sent and backs off for msg1 202 retransmission for the whole bundle.

Some implementations may include parameters used for Msg1 202. For example, some implementations may include a parameter for target received preamble power (PO).

In some implementations, the WTRU may use the same PO for one or more (e.g. all) repetitions in a msg1 202 repetition bundle, possibly if the same Tx beam is used. In some implementations, the WTRU may use a differentiated (e.g., a separately configured value from any other normal RA procedures, such as those initiated without msg1 202 repetition) PO (e.g., configured by RRC) if RA procedure with msg1/3 repetition is used. In some implementations, the WTRU may adjust PO based on measured pathloss (e.g., considering DL and UL beams selected) based on the selected spatial filter or the measured pathloss associated with the SSB to which the RO is mapped. In some implementations, the WTRU may adjust PO based on selected Tx beam and/or selected Rx beam (SSB).

Some implementations may include a power ramping step parameter (e.g., POWER RAMPING STEP). For example, in some implementations, the WTRU may use a differentiated POWER RAMPING STEP (e.g. configured by RRC) if RA procedure with msg1/3 rep is used. In some implementations, the WTRU may adjust POWER RAMPING STEP based on measured pathloss (e.g., considering DL and UL beams selected) based on the selected spatial filter or the measured pathloss associated with the SSB to which the RO is mapped. In some implementations, the WTRU may adjust POWER RAMPING STEP based on selected Tx beam and/or selected Rx beam (SSB).

Some implementations may include other coverage aspects. For example, some implementations may include SUL aspects. In some implementations, the WTRU may be configured with a separate RSRP threshold for the purpose of selecting PRACH resources configured for msg1 202 repetition on the SUL carrier. In some implementations, Msg1 202 repetition and/or PRACH resources on which Msg 1 202 may be repeated and/or configured separately for the NUL and/or the SUL, including related parameters such as the number of repetitions, Msg1 RepMax, the candidate Tx beams to consider for beam sweeping, etc.

In some implementations, the WTRU may initiate an RA procedure with PRACH repetition on the NUL carrier (e.g., if the measured RSRP is larger than the SUL-rsrp threshold), then switch to the SUL after one or more preamble transmissions that <=preambleTransMax.

Some implementations may include BFR+Msg1 202 Repetition. For example, in some implementations, the WTRU may transmit a beam failure recovery request (BFRQ) (msg1 202) using the same CFRA preamble (e.g., that corresponds to the strongest measured CSI-RS) for a configured number of repetitions before the expiry of the RAR window, which may be the same number of repetitions configured for contention-based RA, possibly if msg 1 202 repetition is configured and/or a separate configuration is configured. In some implementations, the WTRU may terminate the repetitions after the WTRU receives a response from the network, e.g., a PDCCH addressed to the WTRU's C-RNTI.

The WTRU may transmit BFRQ (msg1 202) using M different CFRA preambles (corresponding to the N strongest measured CSI-RS), where M is >=N. The WTRU may transmit BFRQ (msg1 202) repeated using a combination of CFRA and CBRA preambles, possibly if the BFR timer has expired.

Some implementations may include frequency hopping and/or PRACH selection for Msg1 202 repetitions. For example, in some implementations, PRACH resource hopping may be used and/or configured to counter interference and/or fade due to frequency selectivity. In some implementations, the WTRU may be predefined or configured to repeat one or more of the copies of Msg1 202 on different Ros in the frequency domain. In some implementations, such configuration may be received on broadcast or dedicated signaling. In some implementations, the WTRU may be predefined or configured with a frequency hopping pattern. For example, in some implementations, the WTRU may select Ros that are successive in time for the repetitions, while frequency hopping (e.g., randomly) among Ros of the same f_id used for RA-RNTI compaction. Additionally or alternatively, in some implementations, the WTRU may hop between Ros of different f_ids.

BWP Aspects may be used herein.

The WTRU may be configured with PRACH resources for msg1 202 repetition on a subset of bandwidth parts in the carrier over which RA is performed. A configuration of whether msg1 202 repetition is performed or not may be configured per uplink bwp, or per PRACH resource config.

The WTRU may switch to another BWP on which resources for msg1 202 repetition is configured, if the criteria for msg1 202 repetition is satisfied and/or there is an insufficient amount of (e.g. no) resources available for msg1 202 repetition in the active bwp. For example, if the measured channel quality is less than a threshold and the current active UL BWP does not support resources for msg1 202 repetition, the WTRU may switch to another UL BWP (e.g. the default or the initial BWP) on which resources for msg1 202 repetition are configured.

The WTRU may be indicated to switch to another BWP for the (re)-transmission of Msg3 206 or the (re)-transmission of msg1 202, whereby such indication may be signaled part of the RAR and/or Backoff indication contents or indicated by DCI for msg2 or msgB. In examples, the WTRU may infer the BWP over which to transmit msg3 206 from the contents of the uplink grant signaled in the RAR and/or a property of the DCI indication scheduling msg2. The WTRU may perform msg3 206 repetition if the WTRU is signaled to switch to another BWP on which msg3 206 repetition is configured, e.g. possibly if the procedure was initiated with msg1 202 repetition (e.g. a PRACH for msg1 202 and/or msg3 206 repetition was selected).

In examples, the WTRU may determine whether to preform msg1 202 and/or msg3 206 repetition before selecting an uplink carrier (e.g. SUL vs. NUL), e.g. before evaluating the RSRP criteria for UL carrier selection. The WTRU may be configured with a separate RSRP threshold for selection of NUL vs. SUL if msg1 202 and/or msg3 206 repetition criteria is satisfied (e.g. channel measured below the configured threshold for repetition). Conversely, the WTRU may determine whether to preform msg1 202 and/or msg3 206 repetition after selecting an uplink carrier (e.g. SUL vs. NUL). In examples, the WTRU may not switch to another BWP after transmitting a preamble on a given BWP. Local transmit beam sweeping with Msg1 202 repetition beginning with respect to determination and configuration of local beam sweeping sets may be used herein.

The WTRU may be configured with a "local beam set" for the purpose of selecting DL beams, corresponding UL beams, sweeping uplink transmit beams, repeating transmission of msg1 202 preambles and/or selecting associated RACH resources. The WTRU may be configured with—or determines—a local beam set size, which is the number of SSBs and/or uplink beams over which the WTRU repeats msg1 202. For example, the WTRU may select the strongest SSB and/or the strongest CSI-RS as according to the strongest measured channel quality (e.g. RSRP or SINR). Additionally or alternatively, he WTRU may select one or more secondary—or adjacent—SSBs and/or CSI-RS resources. Secondary SSBs or CSI-RSs may be selected consecutively from the index of the strongest SSB or strongest CSI-RS.

The WTRU may repeat msg1 202 transmission one or more times less than or equal to the size of the selected local beam set. The WTRU may repeat msg1 202 transmission one or more times less than or equal to the size of the selected local beam set multiplied by a configured number of msg 1 202 repetitions per UL and/or DL beam. In examples, secondary SSBs or CSI-RSs may be selected based on an (e.g. descending) order of channel measurement.

In examples, the WTRU may be configured to perform "repeat and sweep" where the WTRU repeats msg1 202 transmission per beam in the selected local beam set. The WTRU may determine to repeat and sweep if the RSRP corresponding to the SSB around which the WTRU determines to perform beam sweeping is below or equal to the configured threshold.

The WTRU may be configured by broadcast or dedicated signaling with a plurality of local beam sets. The WTRU may be configured with an association between each local beam set and one or more PRACH resources, and/or a starting RO. The associated PRACH resources may be consecutive or spread out in the time and/or frequency domains. The WTRU may use the PRACH resources associated with a selected local beam set to sweep tx/rx beams, possibly after certain Ros defined for the set and/or within a subset of Ros defined by an RO mask for the set. The WTRU may indicate the selected local beam set by transmitting msg1 202 on the associated PRACH resource, whereby msg1 202 may be repeated using different UL beams that correspond to the selected/measured DL beams (SSBs or CSI-RS) that are part of the selected local beam set. The WTRU may first select the DL beam (SSB or CSI-RS) then select the local beam set associated with the DL beam. Additionally or alternatively, the WTRU may select the local beam set that has the strongest total or average channel measurements associated with the beams in the local beam set.

The WTRU may select or determine a local beam set for CFRA with msg1 202 repetition. The local beam set for CFRA may be preconfigured per CFRA resource, indicated by RRC signaling, or indicated by DCI or PDCCH order. For example, the WTRU may receive a PDCCH order indicating the local set to use for the CFRA preamble repetitions, the starting RO, the msg1 202 repetition bundle size, and/or the associated size of the local beam set size. The WTRU may repeat the CFRA preamble transmissions/repetitions on the CFRA PRACH resources associated with the indicated local beam set, or the indicated RO associated with the local beam set. In examples, the WTRU may receive a PDCCH order indicating the local set to use for a given TRP. The WTRU may receive a PDCCH order indicating a certain TRP in the serving cell, or physical cell ID associated with a TRP, over which the WTRU may repeat msg1 202. The WTRU may repeat the CFRA preamble transmissions and/or repetitions on the CFRA PRACH resources associated with the indicated TRP and/or local beam set.

Local transmit beam sweeping with Msg1 202 repetition with respect to local beam set size may be used herein.

For each local beam set, the WTRU may determine an associated beam set size, whereby a beam set size defines the number of SSBs, number of transmit beams, number beam pairs, and/or number of msg1 202 repetitions involved for transmitting msg1 202 over the selected local beam set. The WTRU may receive a configuration of beam set size per local beam set or for one or more (e.g. all) configured local beam sets, where such configuration may be provided by broadcast or dedicated signaling. The WTRU may alternatively determine on its own the size, as described herein. From the configured size for a selected local beam set size "M", the WTRU may further dynamically down-select "N" beam pairs, possibly based on channel measurements—e.g. per the methods described in the next section—, where M and N are configured.

In examples, the WTRU may operate in one of two WTRU operation modes, either with or without beam tx beam sweeping, possibly depending on the WTRU's capability, a configuration, and/or measured channel conditions. The network may configure the WTRU with one of two operation modes by broadcast or dedicated signaling, potentially configured per cell, per PRACH resource, per BWP, or per TRP. The WTRU may determine to operate without beam sweeping (e.g. without msg1 202 repetition using different tx beams, using PRACH resources for legacy WTRUs, or using a local beam set size of 1) if the WTRU determines that beam correspondence is satisfied. In some examples, if the WTRU determines that beam correspondence is satisfied, the WTRU may not select RO associated with beam sweeping (e.g. a PRACH resource configured with a local beam set size larger than 1). In examples, the WTRU may determine that beam correspondence is satisfied if one or more (e.g. multiple or all) beam pairs in the local beam set satisfy channel measurements, and/or have been received successfully.

The WTRU may select a PRACH resource associated with msg1 202 repetition and/or a local beam set with a size>1 to indicate that the WTRU may be capable of beam sweeping (e.g. a PRACH resource configured with msg1 202 repetition using different tx beams or a resource configured with a local beam set size larger than one). Conversely, a WTRU not configured with or not capable of msg1 202 repetition and/or a WTRU not configured with or capable of msg1 202 repetition using different tx beams may not select a PRACH resource associated with a local beam set size larger than 1.

The WTRU may be configured to progressively increase the local beam set size—and/or select a different local beam set, e.g. with a larger size than previous attempt—after one or N configured preamble retransmission(s). The WTRU may consider a preamble to be a retransmission if no RAR was received after the transmission attempt of msg1 202. For example, the WTRU may start with an initial local beam set size then increase the set size after expiry of RAR window for retransmitting msg1 202, after reception of LBT failure indication from lower layers, or after a configured number of retransmissions. In examples, a configured number of retransmissions may be dependent on channel measurement. For example, repetition of msg1 202 may be performed based on a channel condition being below a configured threshold. The number of repetitions may be dependent on the channel conditions (e.g., if channel conditions are below a first threshold, a first number of repetitions may be performed, if channel conditions are lower than a second threshold, a second number of repetitions may be performed). In this manner, worse channel conditions may be used to trigger a greater number of repetitions.

In examples, the WTRU may start with 1 or more of an initial number of repetition(s) of msg1 202 transmission. If LBT fails, the WTRU may increase the reception bundle size for a msg1 202 retransmission by a configured or specified delta number, up to a certain amount (e.g. maximum number) of repetitions configured per bundle. The WTRU may keep using the same UL beam until LBT succeeds for the transmission of one or more repetition attempts. In examples, the WTRU may select a local beam set and/or a msg1 202 repetition bundle size, based on measured RSSI or channel occupancy or based on the number of past LBT failure attempts for previous msg1 202 retransmissions.

Figure 3A:
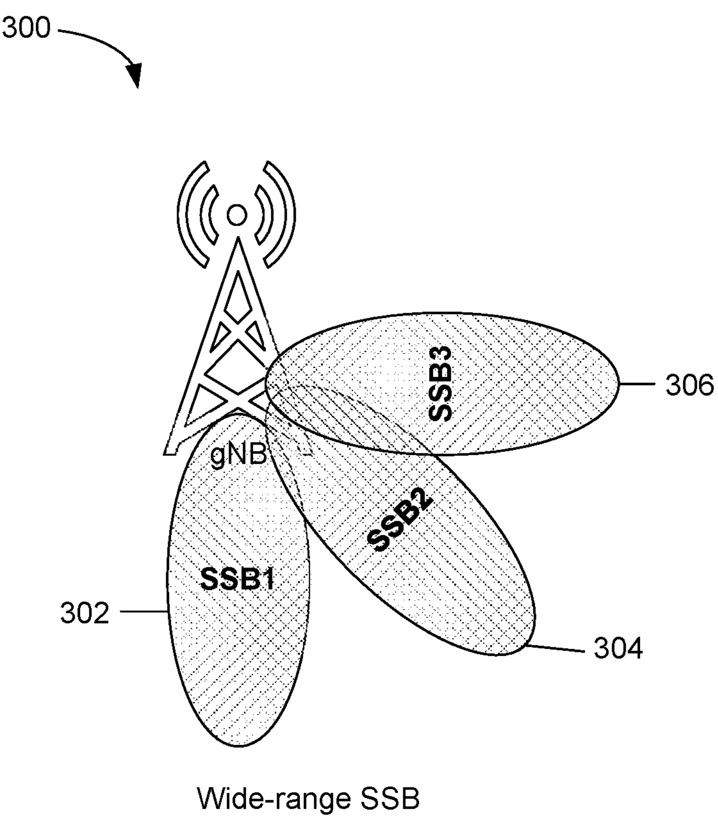
FIG. 3A is an illustration of a wide-range beam SSB.

FIG. 3A illustrates an example of wide-range SSB. FIG. 3A depicts 3 TX beams sweeping at the gNB where SSB1 302, SSB2 304 and SSB3 306 are swept in wider range. FIG.

3B 301 depicts an example of narrow-range SSB. In the narrow-range SSB (e.g., local beam set), SSB2-1 303, SSB2-2 305, and SSB2-3 307 may be swept in a narrower range where "SSB2" is equivalent to SSB2-2. The WTRU may be configured with a narrow range for each SSB in the wide-range. For example, the WTRU may receive configuration, NB=3 and [−15, 15] degrees, which indicate that for each SSB in the wide-range mode, there are NB SSB beams (e.g., SSB2-1 303, SSB2-2 305 and SSB2-3 307 in FIG. 3B) that can be swept between −15 degrees and 15 degrees at equally spaced beam angle with respect to the center SSB.

It may be assumed that there are three Ros each corresponding to SSB in the wide-range SSB in FIG. 3A 301 where Roi corresponds to SSBi (e.g., RO1 is associated with SSB1). If the WTRU observes RSRP above the threshold for one of the SSBs, the WTRU may transmit a preamble at associated RO (e.g., RO2 at t=T 402 if SSB2 is the strongest measured SSB).

In examples, the WTRU may use the same Ros to indicate the WTRU's preference for narrow-range SSB. The WTRU may sweep over the transmit beams associated with the same selected (e.g. wider) SSB, using PRACH resources associated with the selected SSB.

Figure 3B:
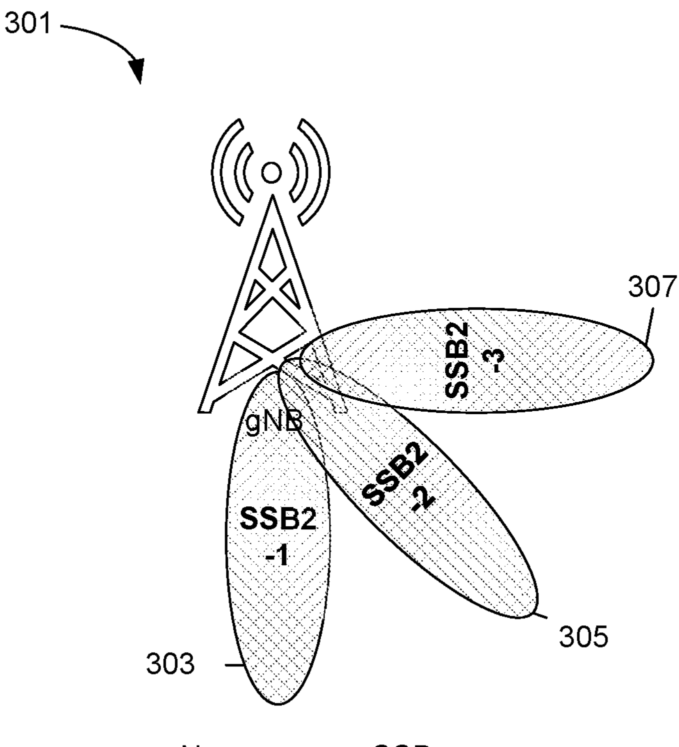
FIG. 3B is an illustration of a narrow range beam SSB.
Figure 4:
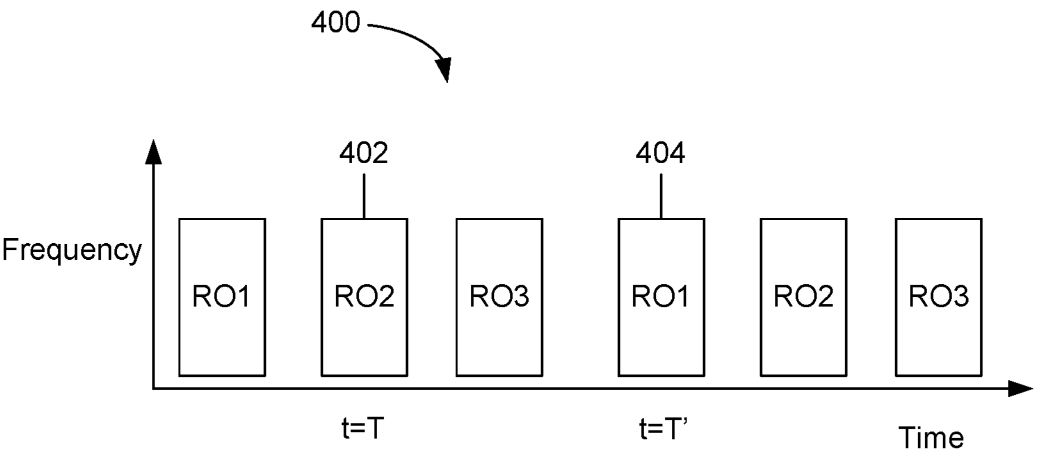
FIG. 4 is a graph illustrating RACH occasions corresponding to SSBs in FIG. 3.

The WTRU may be configured with 2 types of preambles and/or Ros where the first type can be used for indicating a wide-range SSB and one or more is for indicating narrow-range SSB. The WTRU may receive an indication from the network that the network performs both wide and narrow range SSB transmission. For example, as illustrated in FIGS. 3A and 3B, if the measured RSRP for SSB2 is above the threshold, the WTRU may transmit Preamble 1 (e.g., first type of preamble) at RO2 at t=T 402, where the relationship between time and RO are shown in FIG. 4. Followed by transmission of Preamble 1. If the RSRP of SSB2-1 is above the threshold, the WTRU may transmit Preamble 1-1 (e.g., second type of preamble) at RO1 at t=T' 404 (e.g., T<T'), to indicate that the WTRU receives SSB2-1 at a satisfactory RSRP level. In examples, the preamble and/or RO, for indicating the narrower beam, may be configured for a different preamble and/or RO index than that of the wider beam.

Figure 5:
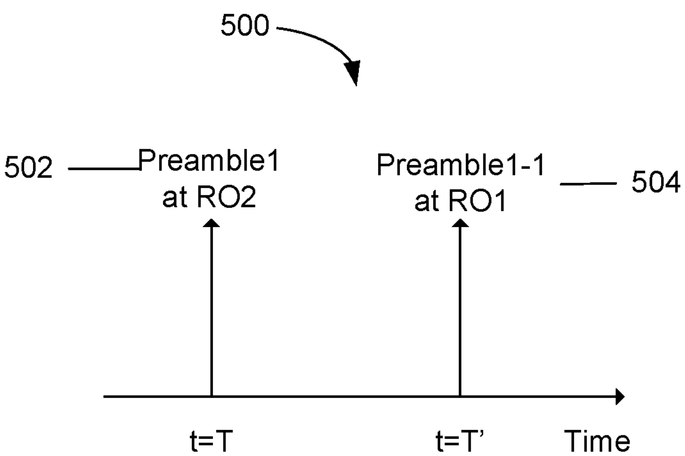
FIG. 5 is an illustration of a WTRU transmission of a preamble for beam sweeping.

By performing the sequential preamble transmission, the WTRU may indicate the WTRU's preferred beams in both wide and/or narrow range using the same set of Ros by using a different preamble. The WTRU may be configured by the first type and/or second type of preambles such that the first type of the preamble is used as a request for narrow-range SSB transmission by the gNB. For example, the WTRU may determine that after the WTRU transmits Preamble1 502, as illustrated in FIG. 5, the WTRU may determine that the gNB performs local beam sweeping at narrower range around SSB2. The WTRU may transmit Preamble1-1 504 in association with the local beam sweeping at narrower range around said SSB2 (e.g. SSB2-1 303; SSB2-2 305, SSB2-3 307)

Local transmit beam sweeping with Msg1 202 repetition with respect to determination of local beam set based on channel measurements/selected SSB may be used herein.

From a multitude of configured local beam sets, the WTRU may select a beam set based on measured channel conditions, e.g. including: L3 RSRP, L1 RSRP, SINR, channel occupancy, RSSI, and/or SS-RSRP. For a selected local beam set, the WTRU may determine the size of the beam set, number of associated SSBs, number of transmit beams used for msg1 202 repetition, and/or the number of msg1 202 repetitions from measured channel conditions and/or from the measurements performed on beams (SSB or CSI-RS) associated with the selected local beam set. For example, for one RSRP range, the WTRU may be configured or pre-specified to select a configured or predetermined number of SSBs, beam pairs, and/or msg1 202 repetitions. For a higher RSRP range, the WTRU may select a lower number of SSBs, beam pairs, and/or msg1 202 repetitions.

To potentially provide coverage (e.g. an even coverage) across the cell in one or more (e.g. different) directions, one or more SSBs may increase coverage more than other SSBs. In some cases (e.g. the boresight of the small cell or the beam), the WTRU may not need msg1 202 repetitions. The WTRU may be configured with a number of msg 1 202 repetitions and/or repetitions per selected SSB according to the selected SSB and/or local beam set. The WTRU may be configured with one or more (e.g. a number of) msg1 202 repetitions and/or one or more (e.g. a number) of beam pairs to sweep over as a function of the measured channel quality. For example, below a certain channel conditions measurement threshold, the WTRU may use a different number of msg 1 202 repetitions and/or one or more beam pairs to sweep over. The WTRU may determine the quality of channel conditions from measurements (e.g. RSRP or SINR) associated with selected SSB(s) for the msg1 202 repetition bundle.

Local transmit beam sweeping with Msg1 202 repetition with respect to termination of beam sweeping/msg1 202 repetitions in the selected local beam set may be used herein.

In examples, the WTRU may be configured to perform local RX or TX beam sweeping during a time window with the configured duration (e.g., indicated by the number of ROs, slots, symbols, milliseconds). The WTRU may receive start and/or end of the time window with respect to a RO or RO associated with the SSB around which the WTRU performs TX/RX beam sweeping. The duration of the time window may be shorter than the number of iterations (e.g., the size of the selected local beam set) the WTRU is configured to repeat msg1 202 transmission. If the WTRU is configured with both time window and number of iterations, the WTRU may determine to prioritize the configuration related to the time window and/or terminate the msg1 202 repetition at the end of the time window. In examples, the WTRU may be configured with a timer duration during which the WTRU performs msg1 202 repetition for RX or TX beam sweeping. The WTRU may start a timer when the WTRU initiates RX or TX beam sweeping and/terminates the sweeping operation when the time expires (e.g., the timer reaches the configured time limit). The WTRU may stop the timer or end the window if the WTRU succeeds LBT for the transmission of one or more msg1 202 repetition(s) associated with at least one SSB.

An association between RAR reception time and SSB may be used herein.

The WTRU may monitor PDCCH for the reception of Msg2 on one or more "RAR reception occasion", where an occasion can be a slot, subslot, or a RAR reception time window. The WTRU may be configured with an association between a local beam set and RAR reception occasion(s). The WTRU may be configured with an association between PRACH resource(s) and RAR reception occasion(s). The WTRU may be configured with an association between a range of RA-RNTIs and RAR reception occasion(s). Upon selection of a local beam set and associated PRACH resource(s) for transmitting the msg1 202 repetitions for the selected local beam set, the WTRU may monitor the RAR occasions associated with the msg1 202 transmission RACH occasions. The association between SSB and RAR reception occasion and/or an association between tx beam and RAR reception occasion may be configured by broadcast or dedicated signaling.

The WTRU may infer the strongest DL beam (e.g. SSB) from the timing or the index of RAR reception of the RAR occasion on which the a RAR was successfully received (e.g. for the RA-RNTI(s) that correspond to the msg1 202 repetitions that were transmitted). The WTRU may assume that the selected SSB is the SSB associated with the RAR occasion on which RAR was received, e.g. for the remainder of the RA procedure (for subsequent msg2 and msg4 reception until the procedure is successful).

In examples, the WTRU may be configured with a "representative SSB or beam" per local beam set, per set of RAR reception occasions associated with a local beam set, or per set of PRACH resources associated with a local beam set. The WTRU may assume that the selected SSB is the representative SSB associated with any of the RAR occasion on which RAR was received and use that SSB for the remainder of the RA procedure.

A repetition within a single RO may be used herein.

The WTRU may change the UL/DL beam pair selected for transmission of msg1 202 within a single RO. For example, the WTRU may repeat the PRACH sequence within the configured PRACH format using different transmit beams and/or using different preambles associated with different selected DL beams. The WTRU may be configured with one or more repetitions per transmit beam before switching to a different beam. With such configuration, the WTRU may repeat the sequence for the configured number of repetitions per beam before switching to a different uplink beam. The WTRU may be configured with an association between the sequence timing and one or more SSB or CSI-RS. The WTRU may indicate the selected SSB(s) from the timing of the transmitted sequence within the RO. The WTRU may insert—or be configured with—a guard period between Ros if the UL and/or DL beams are changed during the msg 1 202 repetition bundle.

For an RO configured to be associated with a certain SSB, the WTRU may indicate sub-beams (e.g. narrower beams as illustrated in FIGS. 3A and 3B) form the selection of the sequence transmission time within the RO.

A dependency on PRACH formats may be used herein.

The WTRU may be configured by broadcast (e.g. SI) or RRC signaling with one or more valid PRACH format per cell, per TRP and/or per physical cell ID. The WTRU may be configured with channel quality threshold (e.g. an RSRP or RS-SINR threshold) that is to be used for evaluating which PRACH format to use. The WTRU may be configured with an association between a PRACH format and a PRACH resource. For each PRACH resource, the WTRU may be configured with an applicable PRACH format, one or more Msg1 202 repetitions, one or more SSBs, associated SSBs, and/or one or more Ros per slot to be used for msg1 202 repetition.

The WTRU may be configured with a channel measurement range association per configured PRACH format and/or per configured RACH resource; the WTRU may select the PRACH resource and/or format according to the measured channel quality. The WTRU may repeat msg1 202 over one or more Ros, e.g. as a combination of repeating the same PRACH sequence within the same RO and/or using multiple Ros for the selected PRACH resource. The WTRU may insert—or be configured with—a guard period between Ros if the UL and/or DL beams are changed during the msg 1 202 repetition bundle.

The WTRU may be configured with a PRACH format and/or resource to SSB(s) association. The WTRU may select a PRACH resource for a certain PRACH format if the WTRU is associated with the selected/strongest measured SSB.

A WTRU may be configured to perform Msg1 202 repetition using multiple panels.

In certain WTRU form-factors or frequency ranges, the antenna spherical coverage requirements may be based on two or more panels. The WTRU may use one or more panels for reception and/or possible transmission. Additionally or alternatively, the WTRU beamforming capability may be less prolific than gNB beam in terms of granularity and/or beam width; beam alignment from the WTRU perspective may be less obvious.

As the WTRU measures several beams while sweeping SSBs, for the initial access there may be a few options for the Msg1 202 repetition based on the measurement results that may be linked to different WTRU panels.

A potential problem, when using multiple panels for Msg1 202 repetition may be the repetition itself (e.g. one or more panels simultaneously), the power allocation along panels that may measure different SSBs and pathloss and the Msg1 202 sequence to be used, and RACH occasion (RO). Some (e.g. all) of these factors may have importance on the following selection of the receiving panel for Msg2.

The gNB may configure PRACH resources or formats based on a WTRU capability, for example. The WTRU may be configured with an association between WTRU reported panels number and PRACH resources. A multiple panel capability reporting may be understood as a spherical coverage based on multiple panels, for example. When this panel based PRACH partitioning occurs, the WTRU may use the allocated resource for PRACH repetition on a specific panel.

When the WTRU measures different SSBs on different panels, the WTRU may be allowed to repeat Msg 1 on one or more different panels in a Time Division manner, meaning using an RO1 for one panel and an RO2 for a second panel. The WTRU may be configured with association between panel and RO and/or preamble index by broadcast or dedicated signaling. The WTRU may select a local beam set for beam seeping such that beam set includes SSB(s) associated with the panels overwhip msg1 202 may be repeated in time domain.

By using two or more different Ros, the reception of the Msg2 may be staggered such that the WTRU may receive an Msg2 on two or more different RAR reception occasions at two or more different times.

In examples, one or more Ros may use different RACH sequences. To resolve a possible Msg1 202 confusion at the gNB, the PRACH sequences association with the Ros per WTRU may be bundled, so the base station may know that based on RO and/or PRACH sequence may be bundled with a sub-sequent different RO and/or PRACH resource.

A WTRU configured to utilize TDM method may be used herein. The TDM method may cycle through the ROs and RACH resources associated with the power ramp up until the WTRU receives a valid Msg2. For example, the TDM method may be associated with a two panel configuration. Upon reception of a valid Msg2 on a panel, the WTRU may abandon the two-panel repletion and continue with the RA procedure (e.g. for Msg3 206 transmission and Msg4 reception) using the successful panel. A two-panel may serve 3 SSBs set and thus the cycling may go for 3 SSBs over two panel by cycling Ros and RACH resources, leading to the same Msg2 reception and/or continuation rule.

In examples, the WTRU may perform simultaneous UL panel transmissions for RACH on different panels in the same RO. he PRACH resources may be different and/or associated with different SSBs. For example, a given RO may be configured to be associated with different SSBs from the same TRP or different TRPs in the cell. The simultaneous transmissions may have to respect a maximum TRP (Total Radiated Power) requirement. Thus, the applicability of simultaneous transmissions may be linked to a certain coverage level where the WTRU power ramping on both transmitting panels may not be a limitation for Msg1 202 repetition. This network may signal the coverage level via a PRACH configuration RSRP level threshold. Additionally or alternatively, the network may signal a separate condition for simultaneous panel transmission of Msg1 202 as a maximum RSRP delta between the candidate beams. Both conditions may be required to apply a simultaneous PRACH transmission of Msg1 202.

As the WTRU performs Msg1 202 repetitions and is ramping up power after each failed attempt (e.g., no Msg2 reception), the power may be ramping up on both panels on each repletion. As the WTRU may see different pathloss on different beams, one panel may reach maximum power faster than the other panel. In this case, to resolve the problem as the output power is capped by WTRU max TRP, some examples may scale down the power limited Tx beam, so the other beam can be transmitted as well. The WTRU may apply a different power ramping step for the different panels, e.g. dependent on the measured pathloss and/or power headroom. Additionally or alternatively, some examples may drop the power limited panel transmission and/or perform potentially one or more of the other beam transmissions. Some examples may fall back to single beam repetition solution after one or more failed Msg1 202 attempts using simultaneous panel transmissions.

When using two panel simultaneous PRACH transmissions, the WTRU may monitor according to the RO timeline the Msg2 reception from the gNB. As the resources for the PRACH may be different and/or per SSB, the WTRU may consider a correct Msg2 received as the end of Msg1 202 retransmission/repetition procedure and/or the WTRU may continue with the remainder of the RA procedure (e.g. for transmission Msg3 206 or reception of Msg4) on the gNB selected beam for Msg2.

Figure 6:
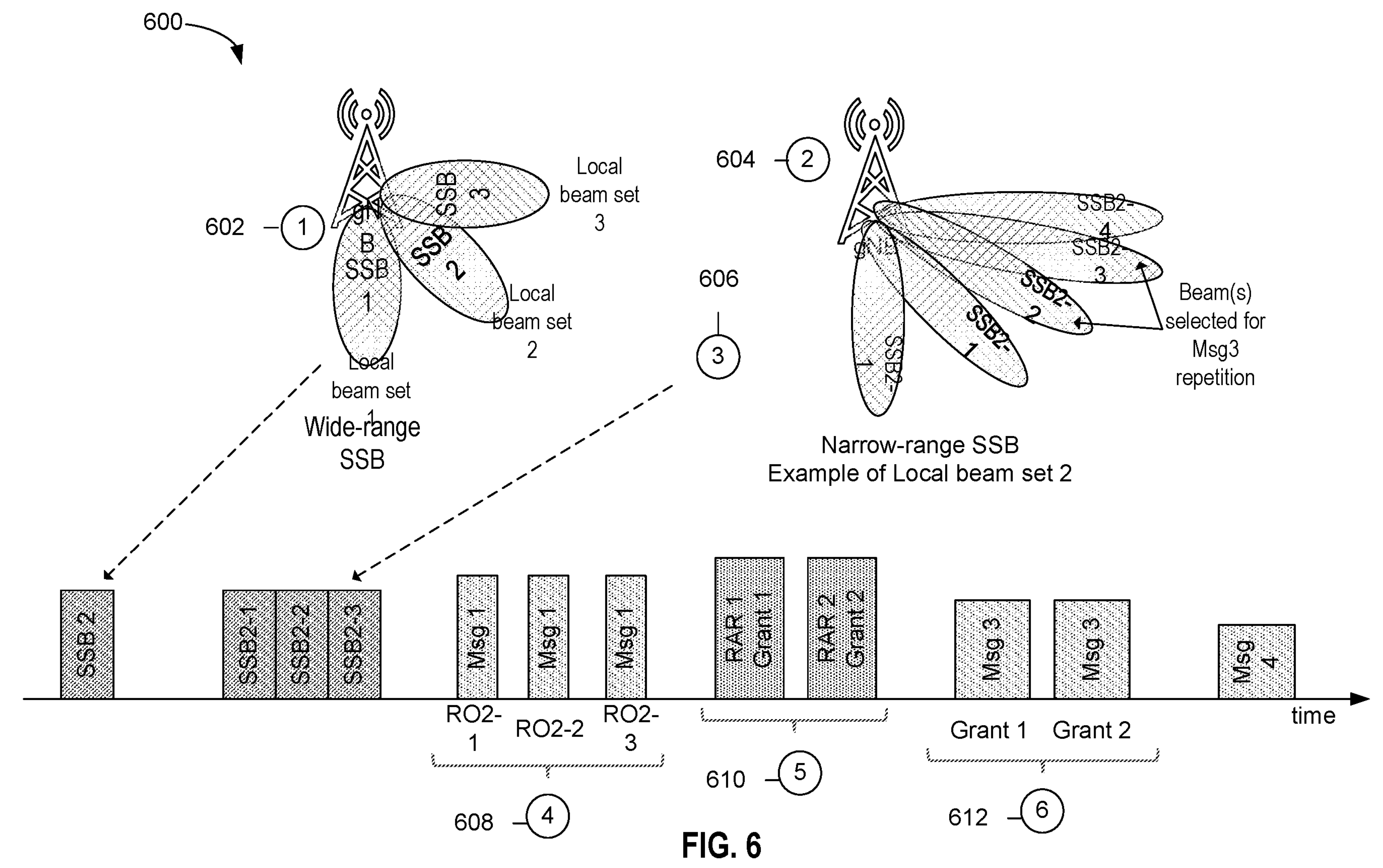
FIG. 6 is an illustration of an example of the WTRU performing a random access procedure using repetition.

FIG. 6 illustrates an example of the WTRU performing RACH with message repetition. For example, at 602 the WTRU may receive one or more SSBs (e.g., SSB1, SSB2, SSB3, etc.). The initially measured/selected SSBs (e.g., SSB1, SSB2, SSB3, etc.) may be relatively wider area beams (e.g., meant to provide greater signal coverage). The WTRU may select one of the SSBs, for example SSB2. The selection may be based on measurements. For example, SSB2 may be the strongest SSB of SSB1, SSB2, SSB3, etc. initially detecting by the WTRU. In an example, the WTRU may receive one or more configurations (e.g. via SIB, dedicated RRC signaling, etc.) that associates each SSB with a local beam set.

For example, at 604 the WTRU may determine that SSB2 is associated with a local beam set 2. In an example, the local beam set 2 may be associated with other SSBs, such as SSB2-1, SSB2-2, SSB2-3, SSB2-4, etc. The beams in the local beam set may be relatively narrower than the originally selected SSB (e.g., SSB2). For example, the beams in the local beam set may be configured to provide narrower coverage within the coverage area of the originally measured beam. In other words, SSB2-1, SSB2-2, SSB2-3, SSB2-4, etc. in the local beam set for SSB2 may be transmitted in the same general area as SSB2, but may provide stronger signal strength in a portion of the area based on more narrow beamforming. Although the local beam set is represented using RSs corresponding to SSBs in this example (e.g., SSB2-1, SSB2-2, SSB2-3, SSB2-4), the local beam set may be defined using other reference signals (e.g., CSI-RSs).

In an example, at 606 the WTRU may measure the local beam set for the selected SSB and select a subset of SSBs associated with the local beam set. In some examples, the WTRU may sweep Msg1 on tx beams and/or ROs associated with the selected subset of the local beam subset. For example, at 608 the WTRU may determine that the subset of local beams to use corresponds to SSB2-1, SSB2-2, and SSB2-3. The WTRU may transmit Msg 1 on random access resources corresponding to the selected beams. For example, RO2-1, RO2-2, and RO2-3 may be random access resources (e.g., ROs) corresponding to selected beams SSB2-1, SSB2-2, and SSB2-3, respectively.

The WTRU may monitor for RAR(s) with RA-RNTIs for the Msg1s sent at 608. At 610, the WTRU may receive RAR1 and RAR2. For instance, RAR1 may correspond to a RAR for Msg 1 transmitted on RO2-1 and RAR2 may correspond to a RAR for Msg 1 transmitted on RO-2-2. As shown in FIG. 6, the RARs may be received for less than an amount (e.g. all) of the transmitted Msg 1s.

At 612, the WTRU may transmit Msg3 based on the received RARs. For example, the WTRU may transmit Msg 3 using grant 1 received in RAR 1 and may transmit a repetition of Msg 3 using Grant 2 received in RAR 2. The Msg 3s may be transmitted using different spatial filters. For example, the Msg 3 transmitted using Grant 1 from RAR 1 may be transmitted with a spatial filter associated with one or more of SSB2-1, RO2-1, the corresponding beam in the local beam set, etc. The Msg 3 transmitted using Grant 2 from RAR 2 may be transmitted with a spatial filter associated with one or more of SSB2-2, RO2-2, the corresponding beam in the local beam set, etc.

Although features and/or elements may be used herein in particular combinations, one of ordinary skill in the art may appreciate that each feature or element may be used alone or in any combination with the other features and/or elements. Additionally or alternatively, the methods used herein may be implemented in a computer program, software, or firmware incorporated in a computer-readable medium for execution by a computer or processor. Examples of computer-readable media may include electronic signals (e.g. transmitted over wired or wireless connections) and/or computer-readable storage media. Examples of computer-readable storage media may include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:

a processor configured to:

select a first synchronization signal block (SSB) based on measurements;

receive configuration information indicating a set of reference signals (RSs) associated with the first SSB and a respective set of random access channel (RACH) occasions (ROs) for each RS in the set;

determine a subset of the set of RSs associated with the first SSB;

transmit a first preamble on a first RO associated with a first RS in the determined subset and a second preamble on a second RO associated with a second RS in the determined subset;

receive a first random access response (RAR) comprising a first grant and a second RAR comprising a second grant, the first RAR being associated with the first RO and the second RAR being associated with the second RO; and transmit a message using the first grant and a repetition of the message using the second grant, wherein the transmission of the message using the first grant uses a spatial filter associated with the first RO and the transmission of the repetition of the message using the second grant uses a spatial filter associated with the second RO.

2. The WTRU of claim 1, wherein the configuration information indicates respective sets of RSs and associated sets of ROs for each of a plurality of SSBs, and wherein the plurality of SSBs comprises at least the first SSB selected by the WTRU.

3. The WTRU of claim 1, wherein the configuration information comprises one or more SSBs or one or more channel state information reference signals (CSI-RSs).

4. The WTRU of claim 1, wherein the subset of the set of RSs is determined based on measurements associated with the first SSB.

5. The WTRU of claim 1, wherein the first SSB is associated with a wide range beam set, wherein the subset of the set of RSs corresponds to a local beam set determined by the WTRU, and wherein the local beam set is narrower than the wide range beam associated with the first SSB.

6. The WTRU of claim 5, wherein the first SSB is associated with a first transmission beam, and the first RS and the second RS are each associated with respective beams of the local beam set, wherein the local beam set is determined based on the wide range beam set associated with the first SSB.

7. The WTRU of claim 1, wherein the processor being configured to transmit the message comprises the processor being configured to transmit a RACH message.

8. The WTRU of claim 7, wherein the processor being configured to transmit the repetition of the message comprises the processor being configured to transmit the repetition of the RACH message.

9. The WTRU of claim 1, wherein the processor is further configured to transmit a second repetition of the message using a third grant, wherein the transmission using the third grant uses a spatial filter associated with a third RO.

10. The WTRU of claim 1, wherein the processor is further configured to receive an indication from the network, wherein the indication indicates that the WTRU is to refrain from using preamble repetitions for a subsequent RACH procedure, and wherein the processor is further configured to, on a condition that the processor receives an indication from a network, switch to a single preamble re-transmission.

11. A method comprising:

selecting a first synchronization signal block (SSB) based on measurements;

receiving configuration information indicating a set of reference signals (RSS) associated with the first SSB and a respective set of random access channel (RACH) occasions (ROs) for each RS in the set;

determining a subset of the set of RSs associated with the first SSB;

transmitting a first preamble on a first RO associated with a first RS in the determined subset and a second preamble on a second RO associated with a second RS in the determined subset;

receiving a first random access response (RAR) comprising a first grant and a second RAR comprising a second grant, the first RAR being associated with the first RO and the second RAR being associated with the second RO; and transmitting a message using the first grant and a repetition of the message using the second grant, wherein the transmission of the message using the first grant uses a spatial filter associated with the first RO and the transmission of the repetition of the message using the second grant uses a spatial filter associated with the second RO.

12. The method of claim 11, wherein the configuration information indicates respective sets of RSs and associated sets of ROs for each of a plurality of SSBs, and wherein the plurality of SSBs comprises at least the first SSB selected by the WTRU.

13. The method of claim 11, wherein the configuration information comprises one or more SSBs or one or more channel state information reference signals (CSI-RSs).

14. The method of claim 11, wherein the subset of the set of RSs is determined based on measurements associated with the first SSB.

15. The method of claim 11, wherein the first SSB is associated with a wide range beam set, wherein the subset of the set of RSs corresponds to a local beam set determined by the WTRU, and wherein the local beam set is narrower than the wide range beam associated with the first SSB.

16. The method of claim 15, wherein the first SSB is associated with a first transmission beam, and the first RS and the second RS are each associated with respective beams of the local beam set, wherein the local beam set is determined based on the wide range beam set associated with the first SSB.

17. The method of claim 11, wherein transmitting the message comprises transmitting a RACH message.

18. The method of claim 17, wherein transmitting the repetition of the message comprises transmitting the repetition of the RACH message.

19. The method of claim 11, wherein the method further comprises transmitting a second repetition of the message using a third grant, wherein the transmission using the third grant uses a spatial filter associated with a third RO.

20. The method of claim 11, wherein the method further comprises receiving an indication from the network, wherein the indication indicates that the WTRU is to refrain from using preamble repetitions for a subsequent RACH procedure, and wherein the method further comprises, on a condition of receiving an indication from a network, switching to a single preamble re-transmission.

* * * * *